United States Patent
Kim et al.

(10) Patent No.: US 9,514,296 B2
(45) Date of Patent: Dec. 6, 2016

(54) AUTOMATIC AUTHORIZATION FOR ACCESS TO ELECTRONIC DEVICE

(71) Applicant: QUALCOMM Incorporated, San Diego, CA (US)

(72) Inventors: Sungwoong Kim, Seoul (KR); Kyuwoong Hwang, Daejeon (KR); Taesu Kim, Suwon (KR); Duck-Hoon Kim, Seoul (KR); Minho Jin, Seoul (KR); Yongwoo Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/480,187

(22) Filed: Sep. 8, 2014

(65) Prior Publication Data

US 2016/0070900 A1 Mar. 10, 2016

(51) Int. Cl.
| | |
|---|---|
| *G06F 21/34* | (2013.01) |
| *G06F 21/35* | (2013.01) |
| *H04W 12/08* | (2009.01) |
| *H04W 4/00* | (2009.01) |
| *H04W 84/18* | (2009.01) |

(52) U.S. Cl.
CPC .............. *G06F 21/34* (2013.01); *G06F 21/35* (2013.01); *H04W 12/08* (2013.01); *H04W 4/008* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 2007/0213045 A1* | 9/2007 | Hermansson | G06F 1/1613 455/425 |
| 2008/0080407 A1 | 4/2008 | Abbate et al. | |
| 2011/0238191 A1 | 9/2011 | Kristjansson et al. | |
| 2012/0094645 A1 | 4/2012 | Jeffrey | |
| 2013/0065517 A1 | 3/2013 | Svensson et al. | |
| 2013/0110804 A1 | 5/2013 | Davis et al. | |
| 2013/0160088 A1* | 6/2013 | McFarland | H04W 12/08 726/4 |
| 2014/0066024 A1 | 3/2014 | Lee et al. | |
| 2014/0220888 A1 | 8/2014 | Shimshoni | |
| 2015/0200776 A1* | 7/2015 | Kao | H04L 9/0844 713/171 |

FOREIGN PATENT DOCUMENTS

| | | |
|---|---|---|
| EP | 2428869 A1 | 3/2012 |
| EP | 2568409 A1 | 3/2013 |

OTHER PUBLICATIONS

International Search Report and Written Opinion—PCT/US2015/045725—ISA/EPO—Nov. 6, 2015, 12 pages.

\* cited by examiner

*Primary Examiner* — Beemnet Dada
(74) *Attorney, Agent, or Firm* — Toler Law Group, PC

(57) ABSTRACT

A method, which is performed in a first electronic device, for authorizing access to a second electronic device is disclosed. The method may include establishing communication between the first electronic device and the second electronic device. The method may also obtain data indicative of a motion of at least one of the first and second electronic devices in response to a movement of the at least one of the first and second electronic devices. Based on the data, a control signal authorizing access to the second electronic device is generated, and transmitted to the second electronic device.

28 Claims, 13 Drawing Sheets

AUTOMATIC AUTHORIZATION FOR ACCESS TO ELECTRONIC DEVICE

TECHNICAL FIELD

The present disclosure relates generally to accessing an electronic device, and more specifically, to automatically authorizing access to an electronic device.

BACKGROUND

Recently, the use of electronic devices such as smartphones, tablet computers, and wearable computers has been increasing among consumers. These devices generally provide a variety of capabilities such as data processing and communication, voice communication, Internet browser, multimedia player, game player, etc. In addition, such electronic devices typically include a variety of applications capable of performing various functions for user convenience.

Conventional electronic devices often provide a security feature to prevent the electronic devices from being used by an unauthorized person. For example, a smartphone may be locked automatically if the smartphone is not used for a specified period of time. In such a case, if a user of the smartphone wants to use the smartphone, he or she may be required to provide authentication information manually to unlock the smartphone. For instance, the user may be required to enter a proper password or other authentication information through a biometric sensor such as a fingerprint sensor, an iris scanner, or the like. Upon entering the proper information, the smartphone may be unlocked for use by the user.

Due to the popularity of such electronic devices, consumers may carry two or more electronic devices. For example, some consumers may carry a smartphone and a smart watch. In such a case, the user may need to manually unlock the smartphone and the smart watch individually each time the user wants to use the devices. For such a user carrying multiple electronic devices, manually unlocking each of the electronic devices individually may be inconvenient and time consuming.

SUMMARY

The present disclosure provides methods and apparatus for automatically authorizing access to an electronic device.

According to one aspect of the present disclosure, a method, performed in a first electronic device, for authorizing access to a second electronic device, is disclosed. The method includes establishing communication between the first electronic device and the second electronic device. The method also obtains data indicative of a motion of at least one of the first and second electronic devices in response to a movement of the at least one of the first and second electronic devices. Based on the data, a control signal authorizing access to the second electronic device is generated and transmitted to the second electronic device. This disclosure also describes an apparatus, a device, a combination of means, and a computer-readable medium relating to this method.

According to another aspect of the present disclosure, an electronic device for authorizing access to a target device is disclosed. The electronic device includes a communication unit configured to establish communication with the target device. The electronic device also includes a data processing unit configured to authorize access to the target device based on data indicative of a motion of at least one of the electronic device and the target device. In this case, the data is obtained in response to a movement of the at least one of the electronic device and the target device. In response to authorizing access to the target device, a signal generation unit is configured to transmit a control signal to the target device via the communication unit.

BRIEF DESCRIPTION OF THE DRAWINGS

Embodiments of the inventive aspects of this disclosure will be understood with reference to the following detailed description, when read in conjunction with the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the present subject matter. However, it will be apparent to one of ordinary skill in the art that the present subject matter may be practiced without these specific details. In other instances, well-known methods, procedures, systems, and components have not been described in detail so as not to unnecessarily obscure aspects of the various embodiments.

FIGS. 1A to 1D illustrate a sequence of motions by a user 110 wearing a smart watch 112 on the wrist of the user's left arm and picking up a smartphone 114 in the user's left hand 116 to use the smartphone 114, according to one embodiment of the present disclosure. One or more motions by the user 110 in the sequence of motions may result in motions by the smart watch 112 and the smartphone 114 that are indicative of the user's intent to use the smartphone 114. Upon detecting the motions of the smart watch 112 and the smartphone 114, the smart watch 112 may process data associated with the motions to determine whether the motions are similar. If it is determined that the motions are similar, the smart watch 112 may generate a signal (e.g., instruction, command, or the like) to authorize access to the smartphone 114 and transmit the signal to the smartphone 114, which may perform a function to provide access to the smartphone 114. In response to the signal, the smartphone 114 may be automatically activated for access to the smartphone 114 by the user 110. For example, the smartphone 114 may be automatically unlocked or may automatically perform a predetermined function such as activating an e-mail application, a messaging application, an SNS application, and the like.

Figure 1A:
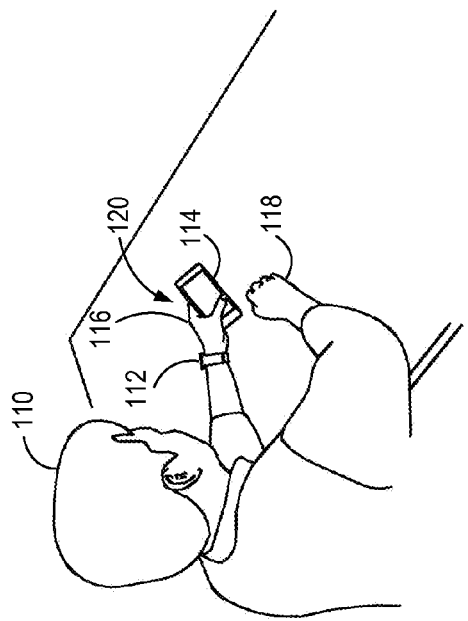
FIGS. 1A to 1D illustrate a sequence of motions by a user wearing a smart watch on a wrist of an arm and holding a smartphone in a hand of the same arm for authorizing access to the smartphone by the smart watch, according to one embodiment of the present disclosure.

FIG. 1A illustrates the user 110 located near the smartphone 114 and wearing the smart watch 112 on the user's left wrist. Initially, the smart watch 112 and the smartphone 114 may be configured to wirelessly communicate with each other using any suitable short range communication technologies such as Bluetooth, Wi-Fi Direct, LTE Direct, NFC (Near Field Communication), UWB (ultra-wideband), IR (infrared) communication technology, and the like. The smart watch 112 and the smartphone 114 may also communicate wirelessly via data communication networks using any suitable communication technologies such as CDMA, GSM, LTE, LTE Advanced, Wi-Fi, and the like. In this configuration, the smart watch 112 and the smartphone 114 may transmit and receive information such as messages, e-mails, SNS messages, and the like through the communication networks.

In one embodiment, the smartphone 114 may initially be in a locked mode to prevent access by an unauthorized user. While the smartphone 114 is in the locked mode, the user 110 may intend to use the smartphone 114 for web surfing, listening to music, gaming, reading an e-book, or the like. The user 110 may also intend to use the smartphone 114 when the smartphone 114 outputs a notification of an event such as a received message, an email, a calendar event, etc. In such cases, the user 110 may pick up the smartphone 114 by either of the user's hand 116 or 118.

Figure 1B:
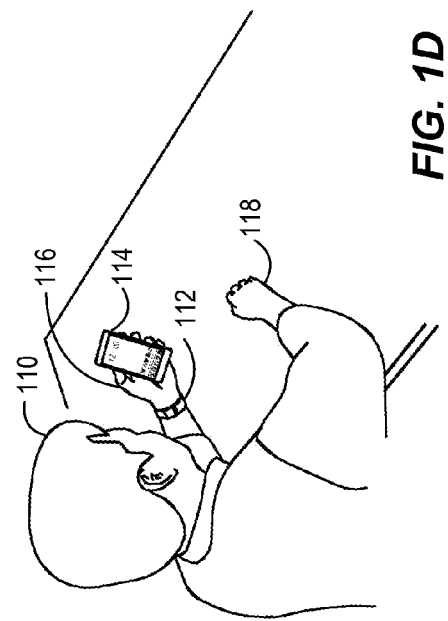

According to the user's intent to use the smartphone 114, the user 110 may proceed to pick up the smartphone 114 by the user's left hand 116 as shown in FIG. 1B according to one embodiment of the present disclosure. In this embodiment, the user 110 may hold the smartphone 114 in the left hand 116 while wearing the smart watch 112 in the left wrist of the user's arm. The smartphone 114 may be equipped with a contact sensor to detect contact with the user's hand 116 or a motion sensor to detect a motion of the smartphone 114 indicative of a motion of picking up a smartphone 114. Upon detecting such contact or motion, the smartphone 114 may communicate with the smart watch 112 to initiate a method of authorizing access to the smartphone 114. In response to such contact or motion, the smart watch 112 and the smartphone 114 may be configured to detect the motions of the smart watch 112 and the smartphone 114, respectively.

Figure 1C:
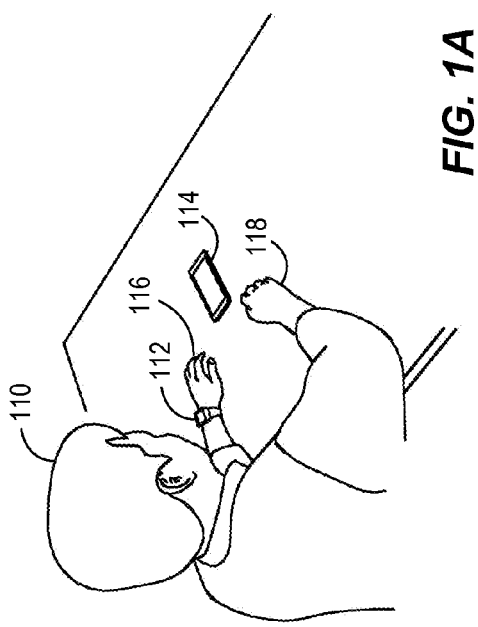

Upon picking up the smartphone 114, the user 110 may move the smartphone 114 toward the user 110 to use the smartphone 114 as depicted in FIG. 1C, according to one embodiment of the present disclosure. In the illustrated embodiment, the user 110 is wearing the smart watch 112 on the left wrist and holding the smartphone 114 in the left hand 116. Accordingly, when the user 110 moves the smartphone 114 toward the user 110 to use the smartphone 114 by moving the left arm, the smart watch 112 and the smartphone 114 may move in a similar manner. In this case, a motion 130 of the smart watch 112 and a motion 132 of the smartphone 114 in response to the user's movement of the left arm may be similar. If it is determined by the smart watch 112 that the motions 130 and 132 of the smart watch 112 and the smartphone 114 are similar, a control signal authorizing access to the smartphone 114 may be generated from the smart watch 112 and transmitted to the smartphone 114.

Figure 1D:
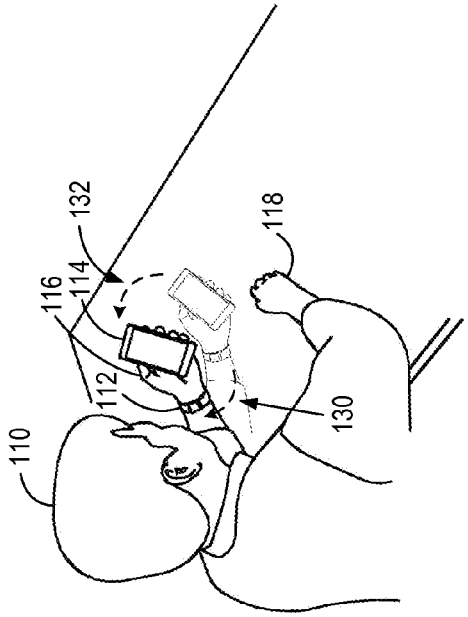

In response to receiving the control signal authorizing access to the smartphone 114, the smartphone 114 may be automatically activated for the user 110 to access the smartphone 114. FIG. 1D shows the user 110 looking at the smartphone 114 that has been activated by the smart watch 112 for access by the user 110. In some embodiments, the smartphone 114 may be automatically unlocked or may automatically perform a predetermined function such as activating an e-mail application, a messaging application, an SNS application, and the like. By allowing access to the smartphone 114 based on the motions 130 and 132 of the smart watch 112 and the smartphone 114, the user 110 may conveniently access to the smartphone 114 without performing additional actions or inputting additional information.

In another embodiment, the smartphone 114 may determine whether to authorize access to the smartphone 114 by comparing the motion 130 of the smart watch 112 and the motion 132 of the smartphone 114. In this case, the smartphone 114 may receive data indicative of the motion 130 of the smart watch 112 and compare the motion data with the motion data of the smartphone 114 to determine whether the motions 130 and 132 are similar. If it is determined that the motions 130 and 132 are similar, the smartphone 114 may be automatically activated for access by the user 110.

FIGS. 2A to 2D illustrate a sequence of motions by the user 110 wearing the smart watch 112 on the wrist of the user's left arm and picking up the smartphone 114 by the user's right hand 118 to use the smartphone 114, according to one embodiment of the present disclosure. One or more motions by the user 110 in the sequence of motions may result in motions by the smart watch 112 and the smartphone 114 that are indicative of the user's intent to use the smartphone 114.

In the illustrated embodiment, the smartphone 114 may be configured to transmit a signal having a predetermined frequency (e.g., an ultrasound signal, a radio signal, etc.). On the other hand, the smart watch 112 may be configured to receive the signal from the smartphone 114 and determine a pattern of change in frequency of the received signal. The pattern of frequency change may be used as data indicative of a relative motion between the smart watch 112 and the smartphone 114.

The smart watch 112 may compare the data associated with the pattern of frequency change with data for a reference pattern of frequency change to determine whether the patterns are similar. If it is determined that the patterns are similar, the smart watch 112 may generate a signal (e.g., instruction, command, or the like) to authorize access to the smartphone 114 and transmit the signal to the smartphone 114, which may perform a function to provide access to the smartphone 114. In response to the signal from the smart watch 112, the smartphone 114 may be automatically activated to allow the user 110 to access the smartphone 114 without an additional input by the user 110. For example, the smartphone 114 may be automatically unlocked or may automatically perform a predetermined function such as activating an e-mail application, a messaging application, an SNS application, and the like.

Figure 2A:
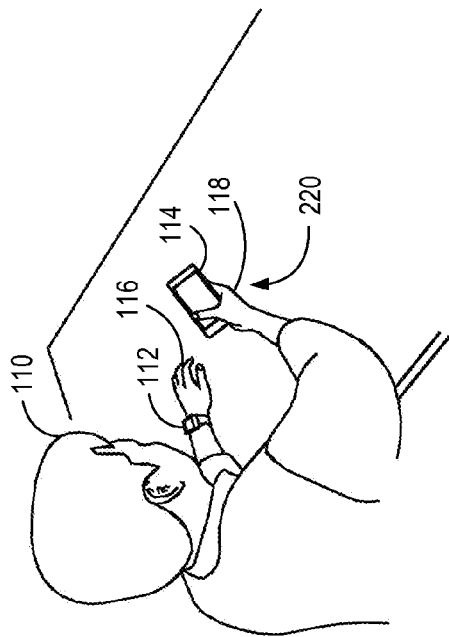
FIGS. 2A to 2D illustrate a sequence of motions by a user wearing a smart watch on a wrist of an arm and holding a smartphone in a hand of the other arm for authorizing access to the smartphone by the smart watch, according to one embodiment of the present disclosure.

FIG. 2A illustrates the user 110 located near the smartphone 114 and wearing the smart watch 112 on the user's left wrist. Similar to the embodiment illustrated in FIG. 1A above, the smart watch 112 and smartphone 114 may be configured to communicate with each other using any suitable short range communication technologies and communicate information such as messages, e-mails, SNS messages, and the like via data communication networks. The smartphone 114 may initially be in a locked mode to prevent access by an unauthorized user.

While the smartphone 114 is in the locked mode, the user 110 may intend to use the smartphone 114 for web surfing, listening to music, gaming, reading an e-book, or the like. The user 110 may also intend to use the smartphone 114 when the smartphone 114 outputs a notification of an event such as a received message, an email, a calendar event, etc. In such cases, the user 110 may pick up the smartphone 114 by the user's right hand 118 to use the smartphone 114 as shown in FIG. 2B.

Figure 2B:
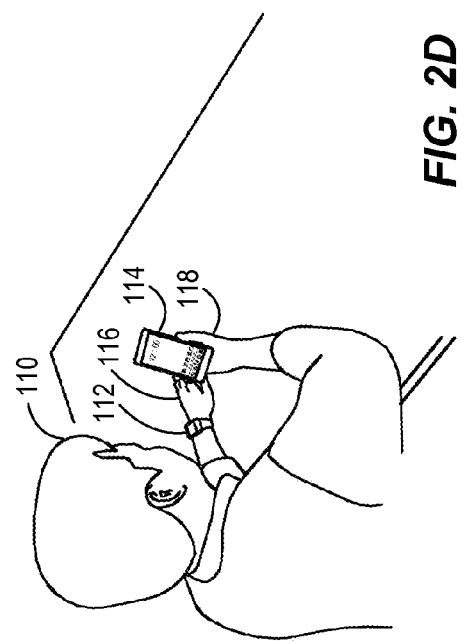

In FIG. 2B, the user 110 may initially pick up and hold the smartphone 114 in the right hand 118 while wearing the smart watch 112 in the left wrist of the user's arm. The contact sensor in the smartphone 114 may be configured to detect contact with the user's hand 118. Additionally or alternatively, the motion sensor in the smartphone 114 may be configured to detect a motion of the smartphone 114 indicative of a motion of picking up a smartphone 114. Upon detecting such contact or motion, the smartphone 114 may communicate with the smart watch 112 to initiate a method of authorizing access to the smartphone 114. In response to such contact or motion, the smartphone 114 may be configured to transmit a frequency signal (e.g., an ultrasound signal, a radio signal, etc.), which may be received by the smart watch 112.

Figure 2C:
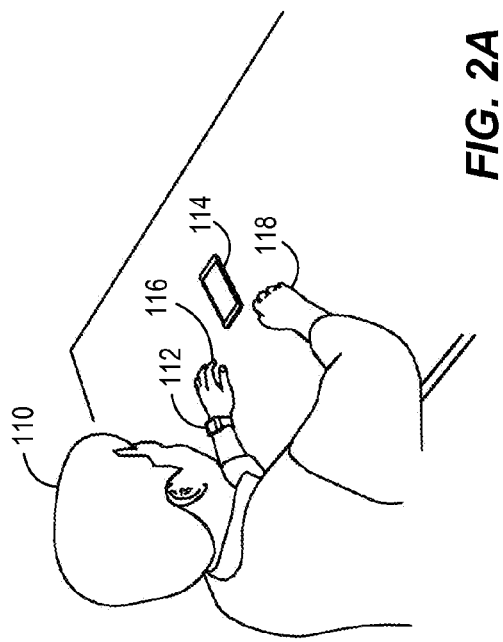

Upon picking up the smartphone 114, the user 110 may move the smartphone 114 toward the user 110 to use the smartphone 114 as shown in FIG. 2C, according to one embodiment of the present disclosure. In the illustrated embodiment, the user 110 is wearing the smart watch 112 on the left wrist and holding the smartphone 114 in the right hand 118. Accordingly, when the user 110 moves the smartphone 114 held in the right hand 118 toward the user 110 to use the smartphone 114 by moving the right arm, the smartphone 114 may move toward or away from the smart watch 112. In this case, a relative motion between the smart watch 112 and the smartphone 114 in moving the smartphone 114 toward the user 110 may be detected as motion data indicative of the user's intent to use the smartphone 114. The motion data may then be compared with reference motion data indicative of a pattern of motion associated with using the smartphone 114. If the detected motion data and the reference motion data are similar, the smart watch 112 may generate a control signal to activate the smartphone 114 for access by the user 110.

In some embodiments, the smart watch 112 may use a pattern of frequency change (e.g., frequency shift) in a signal (e.g., a Doppler signal) received from the smartphone 114 as data indicative of the relative motion between the smart watch 112 and the smartphone 114. For example, when the smartphone 114 transmits a signal such as an ultrasound signal, a radio signal, and the like while moving relative to the smart watch 112, a Doppler frequency shift may occur in the signal due to the relative motion between the smart watch 112 and the smartphone 114. As a result, the smart watch 112 may receive a frequency shifted signal from the smartphone 114. Thus, the smart watch 112 may determine a pattern of frequency change from the received Doppler signal indicative of the relative motion. The pattern of frequency change may then be compared with a reference pattern indicative of a motion associated with using a smartphone. In one embodiment, the smart watch 112 may compare data associated with the pattern of frequency change in the signal with data associated with the reference pattern. If the data are similar, the smart watch 112 may generate a control signal and transmit the control signal to the smartphone 114 to authorize access to the smartphone 114.

Figure 2D:
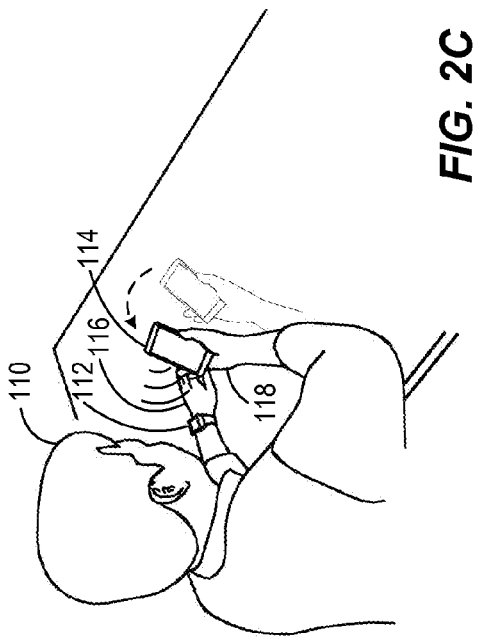

In response to receiving the control signal authorizing access to the smartphone 114, the smartphone 114 may be automatically activated for the user 110 to access the smartphone 114. FIG. 2D shows the user looking at the smartphone 114 that has been activated by the smart watch 112 for access by the user 110. In some embodiments, the smartphone 114 may be automatically unlocked or may automatically perform a predetermined function such as activating an e-mail application, a messaging application, an SNS application, and the like. By allowing access to the smartphone 114 based on the relative motions of the smart watch 112 and the smartphone 114, the user 110 may conveniently access to the smartphone 114 without performing additional actions or inputting additional information.

In another embodiment, the smartphone 114 may determine whether to authorize access to the smartphone 114 by comparing the pattern of frequency change in the Doppler signal and the reference pattern indicative of a motion associated with using a smartphone. In this case, the smartphone 114 may receive data associated with the pattern of frequency change in the Doppler signal and compare the pattern data with the reference pattern data to determine whether the patterns are similar. If it is determined that the patterns are similar, the smartphone 114 may be automatically activated for access by the user 110.

Figure 3:
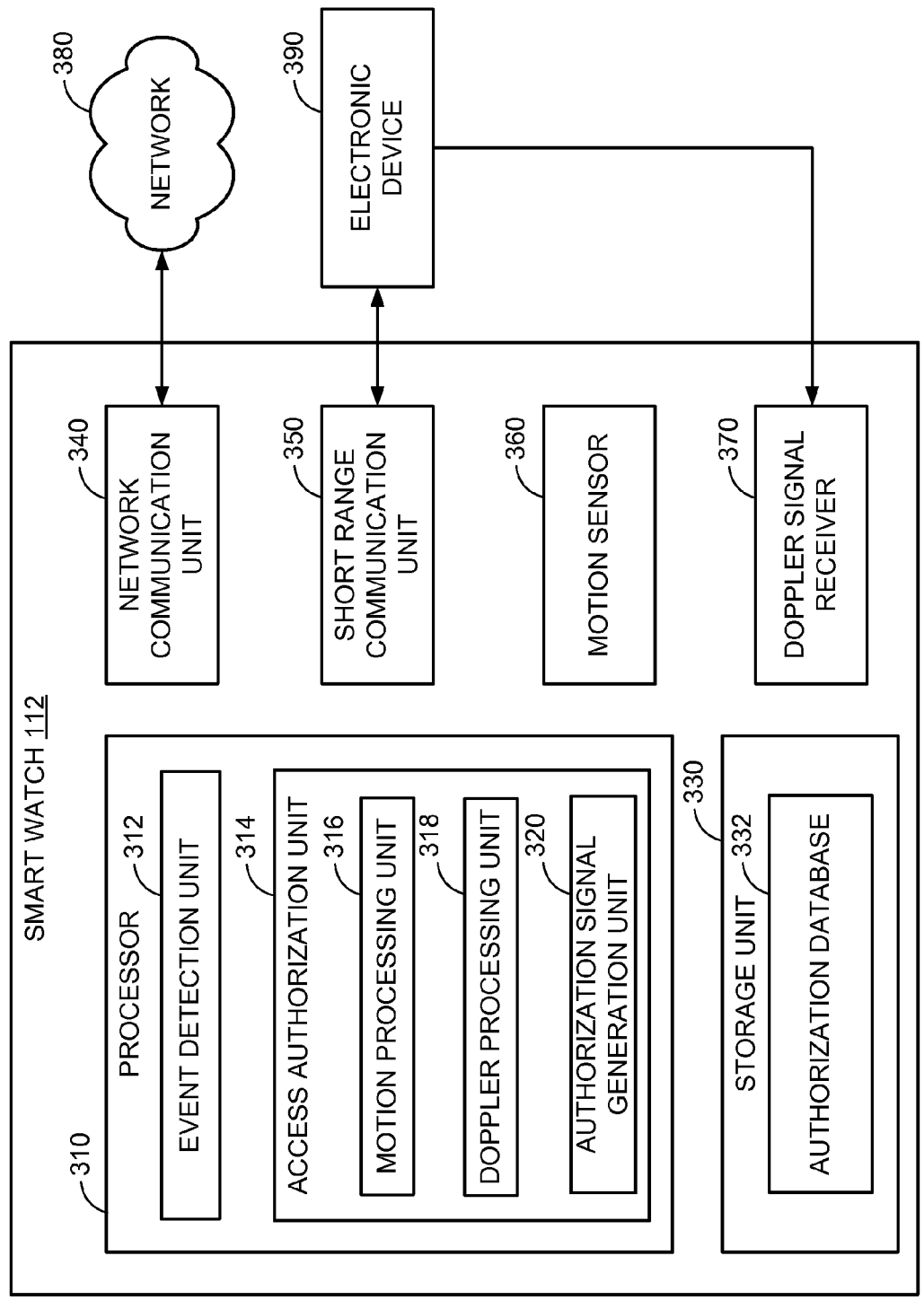
FIG. 3 illustrates a block diagram of a smart watch configured to authorize access to an electronic device in response to a motion of the electronic device and/or a motion of the smart watch, according to one embodiment of the present disclosure.

FIG. 3 illustrates a block diagram of the smart watch 112 configured to authorize access to an electronic device 390 in response to a motion of the smart watch 112 and/or a motion of the electronic device 390, according to one embodiment of the present disclosure. The smart watch 112 may include a processor 310, a storage unit 330, a network communication unit 340, a short range communication unit 350, a motion sensor 360, and a Doppler signal receiver 370. The smart watch 112 may be any suitable wearable devices equipped with motion detecting and processing capabilities. The electronic device 390 may also be any suitable device equipped with motion detecting and processing capabilities such as a cellular phone, a smartphone (e.g., the smartphone 114), a tablet computer, a gaming device, a multimedia player, etc.

The smart watch 112 may be configured to establish communication with the electronic device 390 that is located in close proximity via the short range communication unit 350. The short range communication unit 350 may use any suitable communication technologies such as Bluetooth, Wi-Fi Direct, LTE Direct, NFC, UWB, IR communication technology, and the like. According to one embodiment, the smart watch 112 and the electronic device 390 may be configured to recognize and communicate with each other when they are in close proximity. For example, when the user 110 wearing the smart watch 112 is located near the electronic device 390, the smart watch 112 may automatically recognize the electronic device 390 and establish communication with the electronic device 390 via the short range communication unit 350. Upon establishing communication with the electronic device 390, the smart watch 112 may communicate with the electronic device 390 via the short range communication unit 350 to transmit and receive data for authorizing access to the electronic device 390.

The smart watch 112 may also communicate wirelessly with external devices via the network communication unit 340 over the external network 380. The network communication unit 340 may be configured to communicate with the network 380 through any suitable wireless network communication technologies such as CDMA, GSM, LTE, LTE Advanced, Wi-Fi, and the like. Using such communication schemes, the smart watch 112 may wirelessly transmit and receive information such as messages, e-mails, SNS messages, and the like through the network communication unit 340.

The motion sensor 360 in the smart watch 112 may be configured to detect a motion of the smart watch 112 and obtain data indicative of the motion. For detecting motions of the smart watch 112, the motion sensor 360 may employ any suitable motion sensing devices such as an accelerometer, a gyroscope, and the like. In one embodiment, the motion sensor 360 may detect a motion of the smart watch 112 and generate motion data including acceleration data, trajectory data, orientation data, and/or the like.

The smart watch 112 may receive, via the Doppler signal receiver 370, a Doppler signal indicative of a relative motion between the smart watch 112 and the electronic device 390. The Doppler signal receiver 370 may be configured to receive any suitable signal that may indicate a frequency shift due to a relative motion such as an ultrasound signal, a radio signal, or the like. In one embodiment, the Doppler signal receiver 370 may receive a Doppler signal such as an ultrasound signal from the electronic device 390 as the electronic device 390 is moving relative to the smart watch 112. The Doppler signal may then be provided to the processor 310, which may generate data indicative of a motion from the Doppler signal.

The storage unit 330 in the smart watch 112 may store an authorization database 332 that may be accessed by the processor 310 for determining whether to authorize access to the electronic device 390. The authorization database 332 may include one or more threshold values for determining a degree of similarity in motions, one or more reference patterns of frequency changes, and one or more threshold values for determining a degree of similarity between a pattern of frequency change in a Doppler signal and a reference pattern of frequency change. The storage unit 330 may be implemented using any suitable storage or memory devices such as a RAM (Random Access Memory), a ROM (Read-Only Memory), an EEPROM (Electrically Erasable Programmable Read-Only Memory), a flash memory, or an SSD (Solid State Drive).

The processor 310 may be an application processor (AP), a central processing unit (CPU), or a microprocessor unit (MPU) that may be configured to manage and operate the smart watch 112. As shown in FIG. 3, the processor 310 may include an event detection unit 312 and an access authorization unit 314. Initially, the electronic device 390 may be in a locked mode to prevent access by an unauthorized user. While the electronic device 390 is in such a locked mode, the smart watch 112 may detect a predetermined event indicative of a user's intent to use the electronic device 390. In response to detecting the predetermined event, the smart watch 112 may proceed to determine whether to authorize access to the electronic device 390.

The event detection unit 312 may be configured to detect a predetermined event and instruct the access authorization unit 314 to determine whether to authorize access to the electronic device 390. The predetermined event may include any event or act that may be predetermined to be indicative of a user's intent to use an electronic device. In one embodiment, the predetermined event may include contact (e.g., touch) between a user and the electronic device 390 such as the user's act of holding or picking up the electronic device 390 with the user's hand. In this case, the electronic device 390 may detect contact with the user and transmit a signal indicative of contact to the smart watch 112. In response to the signal indicative of contact, the event detection unit 312 may recognize the signal as a predetermined event indicative of a user's intent to use the electronic device 390.

Additionally or alternatively, an event such as receipt of an e-mail, a message, a calendar event, and the like may be predictive of a user's intent to use an electronic device and recognized as a predetermined event. When such an event is detected or generated, the event detection unit 312 may identify the event as a predetermined event indicative of a user's intent to use the electronic device 390. According to one embodiment, the electronic device 390 may detect an event such as a receipt of an e-mail, a message, a calendar event, and the like and transmit a notification of such an event to the smart watch 112. The event detection unit 312 may receive the notification and identify the notification as a predetermined event indicative of a user's intent to use the electronic device 390.

In an additional or alternative embodiment, one or more motions or patterns of motion of the smart watch 112 and/or the electronic device 390 may be determined to be a predetermined event indicative of a user's intent to use the electronic device 390. In the case of the smart watch 112, the motion sensor 360 may detect such motion of the smart watch 112 and transmit data associated with the motion to the event detection unit 312, which may identify the motion as a predetermined event. On the other hand, the motion of the electronic device 390 may be detected and data for the motion may be transmitted by the electronic device 390 to the smart watch 112. The event detection unit 312 may receive the motion data of the electronic device 390 and may identify the received motion data being indicative of a predetermined event.

Upon identifying an event as a predetermined event, the event detection unit 312 may instruct the access authorization unit 314 to determine whether to authorize access to the electronic device 390. Additionally, the event detection unit 312 may send a signal instructing the motion sensor 360 to detect a motion of the smart watch 112 and a signal instructing the electronic device 390 to detect a motion of the electronic device 390. The electronic device 390 may then detect the motion of the electronic device 390 and transmit data associated with the motion of the electronic device 390 to the smart watch 112.

The access authorization unit 314 in the processor 310 may be configured to determine whether to authorize access to the electronic device 390 in response to an instruction from the event detection unit 312. As shown in FIG. 3, the access authorization unit 314 may include a motion processing unit 316, a Doppler processing unit 318, and an authorization signal generation unit 320. The motion processing unit 316 may be configured to determine whether to authorize access to the electronic device 390 based on motions of the smart watch 112 and the electronic device 390. The Doppler processing unit 318 may determine whether to authorize access to the electronic device 390 based on a pattern of frequency change associated with a frequency shifted Doppler signal received from the electronic device 390. In some embodiments, the motion processing unit 316, the Doppler processing unit 318, or a combination thereof may be referred to as a data processing unit. In response to an instruction from the motion processing unit 316 or the Doppler processing unit 318, the authorization signal generation unit 320 may generate a control signal authorizing access to the electronic device 390 and transmit the signal to the electronic device 390.

In some embodiments, a motion of the smart watch 112 worn on a wrist of a user's arm may be similar to a motion of the electronic device 390 held in a hand of the same arm. For example, the user 110 may be initially wearing the smart watch 112 on the wrist of the user's left arm. The user 110 may then pick up the electronic device 390 in the user's left hand and move the left arm toward the user 110 to use the electronic device 390. In this case, the smart watch 112 and the electronic device 390 may move in a similar pattern or trajectory in response to the movement of the arm. The motion sensor 360 may detect the motion of the smart watch 112 and provide data indicative of the motion to the motion processing unit 316. On the other hand, the motion of the electronic device 390 may be detected and motion data indicative of the motion may be transmitted by the electronic device 390 to the smart watch 112.

The motion processing unit 316 in the access authorization unit 314 may be configured to receive motion data associated with a motion of the smart watch 112 from the motion sensor 360 and motion data associated with a motion of the electronic device 390. Upon receiving the motion data, the motion processing unit 316 may determine whether the motion data of the smart watch 112 and the motion data of the electronic device 390 are similar. If it is determined that the motion data are similar, the motion processing unit 316 may determine that access to the electronic device 390 may be authorized and provide a signal instructing the authorization signal generation unit 320 to authorize access to the electronic device 390.

The motion processing unit 316 in the access authorization unit 314 may determine whether to authorize access to the electronic device 390 based on a degree of similarity in the motions of the smart watch 112 and the electronic device 390. In one embodiment, the motion data of the smart watch 112 and the motion data of the electronic device 390 may be compared to determine a degree similarity. The motion processing unit 316 may access the authorization database 332 in the storage unit 330 to retrieve a similarity threshold. The authorization database 332 may include a plurality of similarity thresholds associated with a plurality of degrees of sensitivity and any suitable similarity threshold may be selected for use in determining the similarity in motions of the smart watch 112 and the electronic device 390. If the degree of similarity is greater than or equal to the similarity threshold, the motions of the smart watch 112 and the electronic device 390 may be determined to be similar. On the other hand, if the degree of similarity is determined to be less than the similarity threshold, the motion processing unit 316 may determine that access to the electronic device 390 is not authorized. In this case, a signal may be generated and provided to the authorization signal generation unit 320 indicating that access to the electronic device is not authorized. Alternatively, no signal may be generated or provided to the authorization signal generation unit 320.

In some embodiments, the smart watch 112 may determine whether to authorize access to the electronic device 390 based on a pattern of frequency change in a Doppler signal. For example, the user 110 may initially be wearing the smart watch 112 on the wrist of the user's left arm. The user 110 may then pick up the electronic device 390 in the user's right hand and move the right arm toward the user 110 to use the electronic device 390. In this case, the electronic device 390 may move toward or away from the smart watch 112 on the left wrist of the user's left arm. In this case, the electronic device 390 may transmit a Doppler signal while the electronic device 390 is being held and moved in the user's hand. The Doppler signal receiver 370 in the smart watch 112 may receive the Doppler signal from the electronic device 390 while the electronic device 390 is being moved toward the user 110. In this case, the electronic device 390 may also move toward or away from the smart watch 112. Accordingly, the frequency in the Doppler signal received by the Doppler signal receiver 370 in the smart watch 112 may be shifted due to the relative motion between the smart watch 112 and the electronic device 390. Upon receiving the frequency shifted Doppler signal, the Doppler signal receiver 370 may provide the frequency shifted Doppler signal to the Doppler processing unit 318 in the access authorization unit 314.

Upon receiving the frequency shifted Doppler signal from the Doppler signal receiver 370, the Doppler processing unit 318 may determine a pattern of frequency change (e.g., frequency shift) from the frequency shifted Doppler signal as motion data indicative of a user's intent to use the electronic device 390. For example, a plurality of frequency shifted values may be detected as a function of time from the frequency shifted Doppler signal as the pattern of frequency change in the Doppler signal. In this case, the frequency shifted values that are mapped as a function of time may be detected as the pattern of frequency change. When the pattern of frequency change has been determined, the Doppler processing unit 318 may access the plurality of reference patterns of frequency change in the authorization database 332 indicative of a user's intent to use an electronic device. The Doppler processing unit 318 may then determine whether the pattern of frequency change in the Doppler signal is similar to any of the reference patterns of frequency change, as will be described below in more detail with reference to FIG. 5.

In one embodiment, the pattern of frequency change in the Doppler signal may be compared with the plurality of reference patterns to identify a reference pattern that is similar to the pattern of frequency change in the Doppler signal. In this case, a degree of similarity may be determined between the pattern of frequency change in the Doppler signal and one or more reference patterns. The Doppler processing unit 318 may then identify one or more reference patterns having a degree of similarity with the pattern of frequency change in the Doppler signal that is equal to or greater than a predetermined threshold. If a similar reference pattern is identified, the Doppler processing unit 318 may determine that access to the electronic device 390 may be authorized and provide a signal instructing the authorization signal generation unit 320 to generate a control signal authorizing access to the electronic device 390. Otherwise, the Doppler processing unit 318 may determine that access to the electronic device 390 is not authorized.

Figure 4:
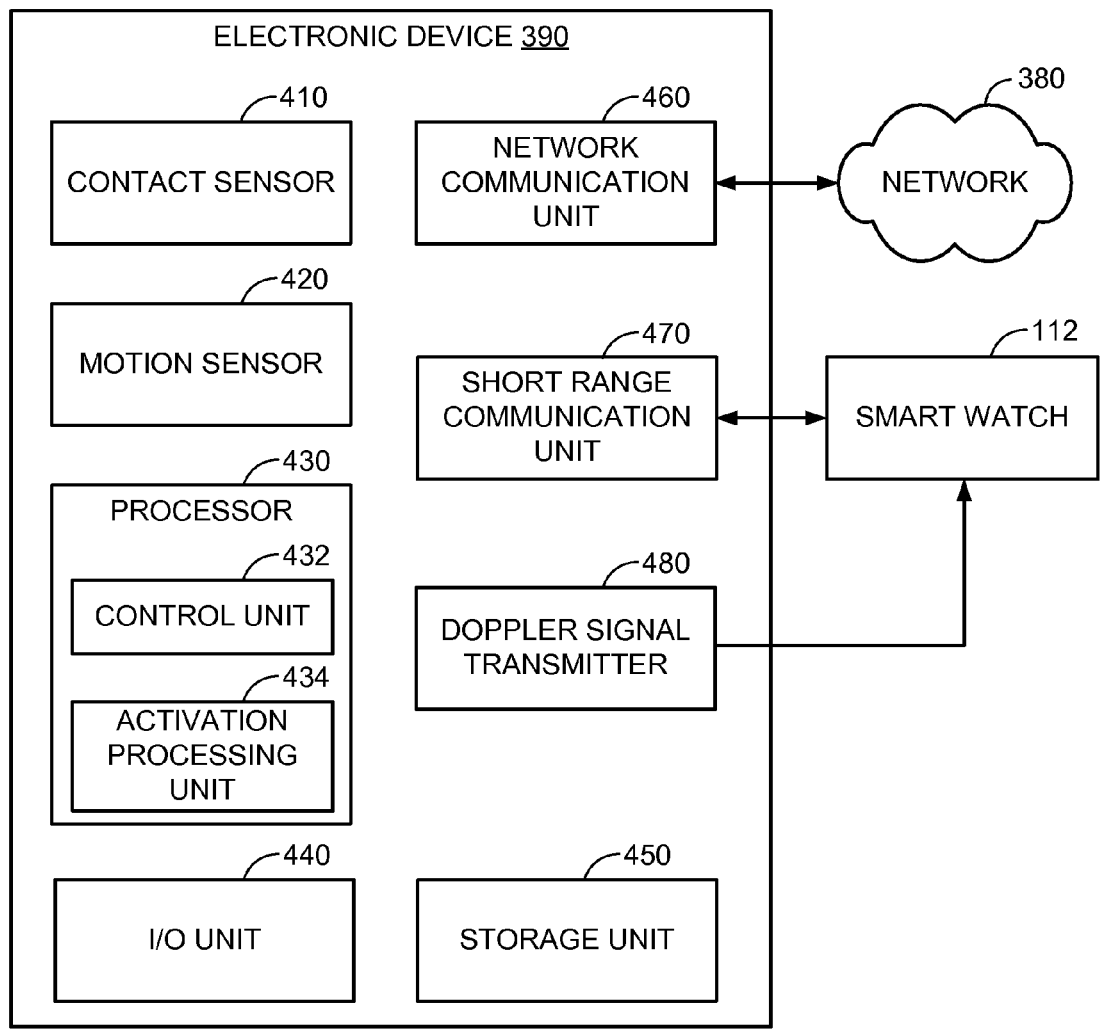
FIG. 4 illustrates a block diagram of an electronic device configured to be activated in response to a command to access to the electronic device from a smart watch, according to one embodiment of the present disclosure.

FIG. 4 illustrates a block diagram of the electronic device 390 that may be activated in response to a command to access to the electronic device 390 from the smart watch 112, according to one embodiment of the present disclosure. The electronic device 390 may include a contact sensor 410, a motion sensor 420, a processor 430, an I/O unit 440, a storage unit 450, a network communication unit 460, a short range communication unit 470, and a Doppler signal transmitter 480. As described with reference to FIG. 3, the electronic device 390 may be any suitable electronic device such as a cellular phone, a smartphone (e.g., the smartphone 114), a tablet computer, a gaming device, a multimedia player, or the like.

The processor 430 may include a control unit 432 and an activation processing unit 434. The processor 430 may be an application processor (AP), a central processing unit (CPU), or a microprocessor unit (MPU) that may be configured to manage and operate the electronic device 390. The control unit 432 may be configured to manage and control overall operations of the electronic device 390. The activation processing unit 434 may be configured to manage and control operations for activating the electronic device 390. The control unit 432 and the activation processing unit 434 may be implemented as software, hardware, or a combination thereof.

The I/O unit 440 in the electronic device 390 may be configured to receive an input from a user and/or output information for the user. The I/O unit 440 may be any suitable device capable of receiving an input command and/or outputting information such as a display screen, a touch screen, a touchpad, a button, a key, and the like. The storage unit 450 in the electronic device 390 may be used to store data, applications, databases, and the like that may be used or generated by the electronic device 390. The storage unit 450 may be implemented using any suitable storage or memory devices such as a RAM, a ROM, an EEPROM, a flash memory, an SSD, and the like.

The electronic device 390 may establish communication with the smart watch 112 when the smart watch 112 is located within communication range of the short range communication unit 470 in the electronic device 390. The short range communication unit 470 may employ any suitable communication technologies that may be used by the short range communication unit 350 of the smart watch 112 shown in FIG. 3 to communicate with the smart watch 112. According to one embodiment, the smart watch 112 and the electronic device 390 may recognize and communicate with each other when the short range communication units 350 and 470 are within communication range. Upon establishing communication with the smart watch 112, the electronic device 390 may communicate with the smart watch 112 via the short range communication unit 470 to transmit and receive data for authorizing access to the electronic device 390.

The electronic device 390 may also communicate wirelessly with external devices via the network communication unit 460 over the external network 380. The network communication unit 460 may be configured to communicate with the network 380 through any suitable wireless network communication technologies such as CDMA, GSM, LTE, LTE Advanced, Wi-Fi, etc. In this configuration, the electronic device 390 may also wirelessly transmit and receive information such as messages, e-mails, SNS messages, and the like through the network communication unit 460.

The contact sensor 410 in the electronic device 390 may be configured to detect contact (e.g., touch) between the electronic device 390 and a user. For detecting a user's contact with the electronic device 390, the contact sensor 410 may include any suitable sensors or sensing devices capable of detecting physical contact or touch by a user such as a tactile sensor, a pressure sensor, a temperature sensor, a touch sensor (e.g., a touch screen), and the like, and may be located in any suitable locations in the electronic device 390. When a user touches or contacts the electronic device 390, the contact sensor 410 may generate a signal indicative of contact and provide the signal to the activation processing unit 434. The activation processing unit 434 may then transmit the signal indicative of contact to the smart watch 112 via the short range communication unit 470.

The motion sensor 420 in the electronic device 390 may be configured to detect a motion of the electronic device 390 and generate data indicative of the motion. In some embodiments, the motion sensor 420 may detect a motion of the electronic device 390 and generate motion data including acceleration data, trajectory data, orientation data, and/or the like. For detecting motions of the electronic device 390, the motion sensor 420 may employ any suitable motion sensing devices such as an accelerometer, a gyroscope, and the like. In one embodiment, a motion indicative of a user's intent to use an electronic device may be detected by the motion sensor 420. For example, the motion sensor 420 may detect a motion of a user in picking up the electronic device 390 and generate motion data for the detected motion. The motion data may then be provided to the activation processing unit 434, which may transmit the motion data indicative of a user's intent to use the electronic device 390 to the smart watch 112 via the short range communication unit 470.

Additionally or alternatively, the electronic device 390 may receive an e-mail, a message, a calendar event, and the like. Such events may be predictive of a user's intent to use the electronic device 390 and may be considered to be indicative of a user's intent to use the electronic device 390. When such an event is received or generated, the activation processing unit 434 may transmit a signal indicative of a user's intent to use the electronic device 390 to the smart watch 112 via the short range communication unit 470.

The event detection unit 312 in the smart watch 112 may receive one or more signals indicating contact, a motion, and/or an event indicative of a user's intent to use the electronic device 390 from activation processing unit 434 in the electronic device 390. In response to the signals, the event detection unit 312 may recognize the signals as one or more predetermined events indicative of a user's intent to use the electronic device 390 as described with reference to FIG. 3. Upon recognizing one or more predetermined events, the event detection unit 312 may transmit a signal instructing the electronic device 390 to start detecting motion and transmitting a Doppler signal via the short range communication unit 350. The activation processing unit 434 in the electronic device 390 may receive the signal via the short range communication unit 470 and provide an instruction to the motion sensor 420 to start detecting motion and an instruction to the Doppler signal transmitter 480 to start transmitting a Doppler signal.

In response to the instruction from the activation processing unit 434, the motion sensor 420 may start detecting a motion of the electronic device 390. Upon detecting the motion, the motion sensor 420 may generate motion data for the detected motion and provide the motion data to the activation processing unit 434. The activation processing unit 434 may then transmit the motion data to the access authorization unit 314 in the smart watch 112 via the short range communication unit 470.

The Doppler signal transmitter 480 may receive the instruction from the activation processing unit 434 to start transmitting a Doppler signal. The Doppler signal transmitter 480 may be configured to transmit any suitable signal that may indicate a frequency shift due to a relative motion such as an ultrasound signal, a radio signal, or the like. In response to the instruction, the Doppler signal transmitter 480 may start transmitting a Doppler signal. The Doppler signal receiver 370 in the smart watch 112 may receive the Doppler signal that has been frequency shifted due to a relative motion between the electronic device 390 and the smart watch 112.

The smart watch 112 may generate a control signal authorizing access to the electronic device 390 and transmit the control signal to the electronic device 390 via the short range communication unit 350. The activation processing unit 434 may receive the control signal authorizing access to the electronic device 390 and activate the electronic device 390 to allow access by a user. In one embodiment, the activation processing unit 434 may activate the electronic device 390 by automatically unlocking the electronic device 390 to display a startup or home screen, or performing a predetermined function without performing additional actions or inputting additional information by a user. For example, when the predetermined event is an event such as receiving an e-mail, a message, or an SNS message, the activation processing unit 434 may activate an e-mail application, a messaging application, an SNS application, or the like. In this case, a specific e-mail, message, or SNS message may be directly activated and displayed on a display screen of the I/O unit 440.

Additionally or alternatively, the electronic device 390 may determine whether to authorize access to the electronic device 390 based on motions of the smart watch 112 and the electronic device 390 or a pattern of frequency change in a Doppler signal. In this case, the activation processing unit 434 may receive motion data of the smart watch 112 or the pattern of frequency change in a Doppler signal from the smart watch 112. Further, the electronic device 390 may also be configured to determine whether a predetermined event is detected. In some embodiments, the processor 430 in the electronic device 390 may include one or more processing units in the processor 310 of the smart watch 112. For example, the processor 430 may also include the event detection unit 312, the motion processing unit 316, and/or the Doppler processing unit 318 in the smart watch 112. In addition, the storage unit 450 in the electronic device 390 may store the authorization database 332 of the smart watch 112.

Figure 5:
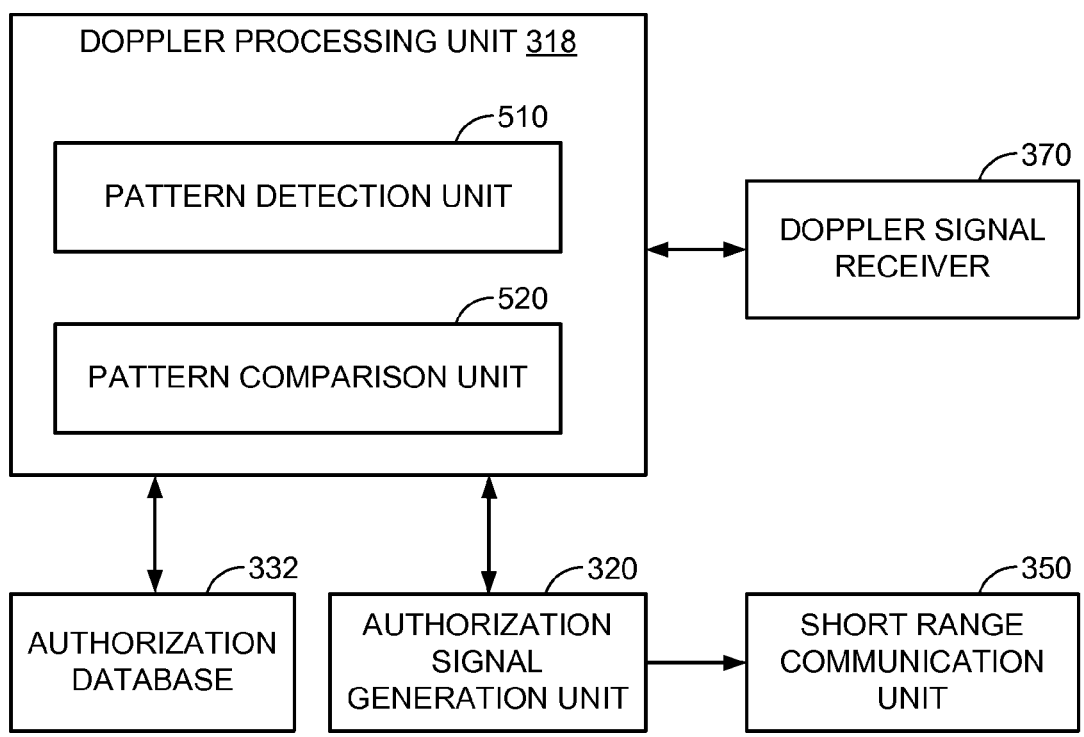
FIG. 5 illustrates a block diagram of a Doppler processing unit in a smart watch configured to determine whether to authorize access to an electronic device in response to a Doppler signal received from the electronic device, according to one embodiment of the present disclosure.

FIG. 5 illustrates a block diagram of the Doppler processing unit 318 in the smart watch 112 configured to determine whether to authorize access to the electronic device 390 in response to a Doppler signal received from the electronic device 390, according to one embodiment of the present disclosure. The Doppler processing unit 318 may include a pattern detection unit 510 and a pattern comparison unit 520. In one embodiment, the Doppler processing unit 318 may be activated in response to an instruction from the event detection unit 312 to determine whether to authorize access to the electronic device 390.

The pattern detection unit 510 may receive the Doppler signal from the Doppler signal receiver 370. The Doppler signal received by the Doppler signal receiver 370 from the Doppler signal transmitter 480 in the electronic device 390 may be frequency shifted due to a relative motion between the smart watch 112 and the electronic device 390. Upon receiving the frequency shifted Doppler signal, the pattern detection unit 510 may determine a pattern of frequency change in the Doppler signal as motion data indicative of relative motion between the smart watch 112 and the electronic device 390.

In one embodiment, the pattern detection unit 510 may detect a plurality of frequency shifted values as a function of time from the frequency shifted Doppler signal as a pattern of frequency change in the Doppler signal. For example, the frequency shifted values that are mapped as a function of time may be detected as the pattern of frequency change. In some embodiments, the pattern of frequency change may be determined as a maximum frequency shifted value in the Doppler signal, a shape of frequency spectrum for the Doppler signal obtained at a certain point in time (e.g., at a time when a maximum frequency shift occurs), a direction of frequency shift in the Doppler signal, or the like. Upon determining the pattern of frequency change, the pattern detection unit 510 may provide the determined pattern to the pattern comparison unit 520.

The pattern comparison unit 520 in the Doppler processing unit 318 may receive the pattern of frequency change in the Doppler signal and access the plurality of reference patterns of frequency change in the authorization database 332 that are indicative of a user's intent to use an electronic device. The pattern of frequency change in the Doppler signal may then be compared with one or more reference patterns from the authorization database 332 to identify a reference pattern that is similar to the pattern of frequency change in the Doppler signal. In one embodiment, a degree of similarity may be determined between the pattern of frequency change in the Doppler signal and one or more reference patterns. The pattern comparison unit 520 may then identify one or more reference patterns having a degree of similarity that is equal to or greater than a predetermined threshold, which may be selected from a plurality of predetermined thresholds associated with a plurality of sensitivity levels. If a similar reference pattern is identified, the pattern comparison unit 520 may determine that access to the electronic device 390 may be authorized and provide a signal instructing the authorization signal generation unit 320 to generate a control signal authorizing access to the electronic device 390. The authorization signal generation unit 320 may generate the control signal authorizing access to the electronic device and transmit the signal to the electronic device 390 via the short range communication unit 350. On the other hand, if a similar reference pattern is not identified, the pattern comparison unit 520 may determine that access to the electronic device 390 is not authorized.

In some embodiments, the smart watch 112 and/or the electronic device 390 may be equipped with a Doppler signal transceiver that may transmit and receive Doppler signals. Additionally or alternatively, the smart watch 112 may be configured to transmit a Doppler signal and the electronic device 390 may be configured to receive the Doppler signal. In another embodiment, a Doppler signal transceiver in either the smart watch 112 or the electronic device 390 may be configured to transmit a Doppler signal and receive a reflected Doppler signal.

Figure 6:
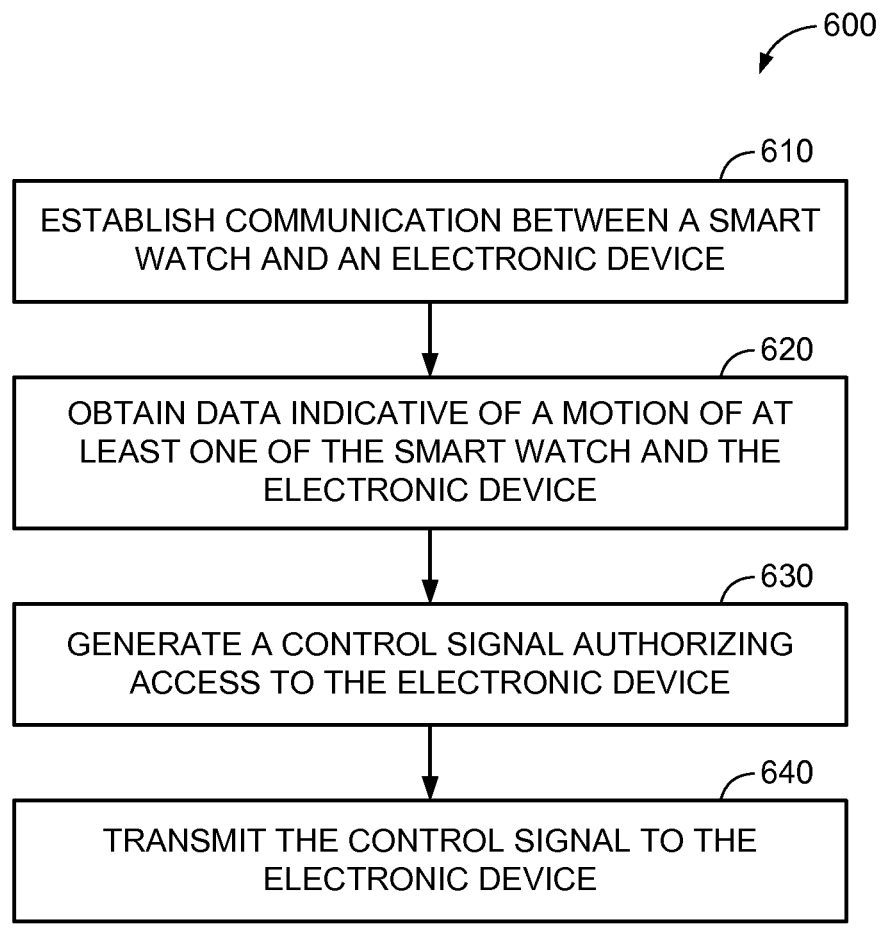
FIG. 6 illustrates a flowchart of a method, performed in a smart watch, for authorizing access to an electronic device in response to a motion of at least one of the smart watch and the electronic device, according to one embodiment of the present disclosure.

FIG. 6 illustrates a flowchart of a method 600, performed in the smart watch 112, for authorizing access to the electronic device 390 in response to a motion of at least one of the smart watch 112 and the electronic device 390, according to one embodiment of the present disclosure. When the short range communication units 350 and 470 of the smart watch 112 and the electronic device 390 are within communication range, communication between the smart watch 112 and the electronic device 390 may be established, at 610. Upon establishing the communication, the smart watch 112 may communicate with the electronic device 390 via the short range communication units 350 and 470 to transmit and receive data for authorizing access to the electronic device 390.

The smart watch 112 may obtain data indicative of a motion of at least one of the smart watch 112 and the electronic device 390, at 620. The motion sensor 360 in the smart watch 112 may detect the motion of the smart watch 112. On the other hand, the motion sensor 420 in the electronic device 390 may detect the motion of the electronic device 390 and then transmit the motion data indicative of the motion of the electronic device 390 to the smart watch 112. In one embodiment, upon detecting a predetermined event in at least one of the smart watch 112 and the electronic device 390, the smart watch 112 may obtain the data indicative of the motion of at least one of the smart watch 112 and the electronic device 390. In this case, the predetermined event may include at least one of contact with the electronic device 390, a receipt of a message, a predetermined motion of the smart watch 112, and a predetermined motion of the electronic device 390.

Based on the obtained data indicative of the motion of at least one of the smart watch 112 and the electronic device 390, the smart watch 112 may generate a control signal authorizing access to the electronic device 390, at 630. In one embodiment, the obtained data indicative of the motion of at least one of the smart watch 112 and the electronic device 390 may include the motion of the smart watch 112 and the motion of the electronic device 390. In this embodiment, the obtained motion data may include at least one of acceleration data, trajectory data, orientation data, and location data of the smart watch 112 and the electronic device 390. According to another embodiment, the obtained data may include a pattern of frequency change in a Doppler signal received from the electronic device 390, which may be indicative of a relative motion between the smart watch 112 and the electronic device 390.

The control signal may then be transmitted to the electronic device 390 to authorize access to the electronic device 390 via the short range communication unit 350 of the smart watch 112, at 640. In this process, the control signal may be adapted to instruct the electronic device 390 to perform a function to provide access to the electronic device 390. For example, the electronic device 390 may be automatically unlocked or may automatically perform a predetermined function such as activating an e-mail application, a messaging application, an SNS application, and the like. By allowing access to the electronic device 390 based on the data indicative of the motion of at least one of the smart watch 112 and the electronic device 390, a user may conveniently access to the electronic device 390 without performing additional actions or inputting additional information by the user.

Figure 7:
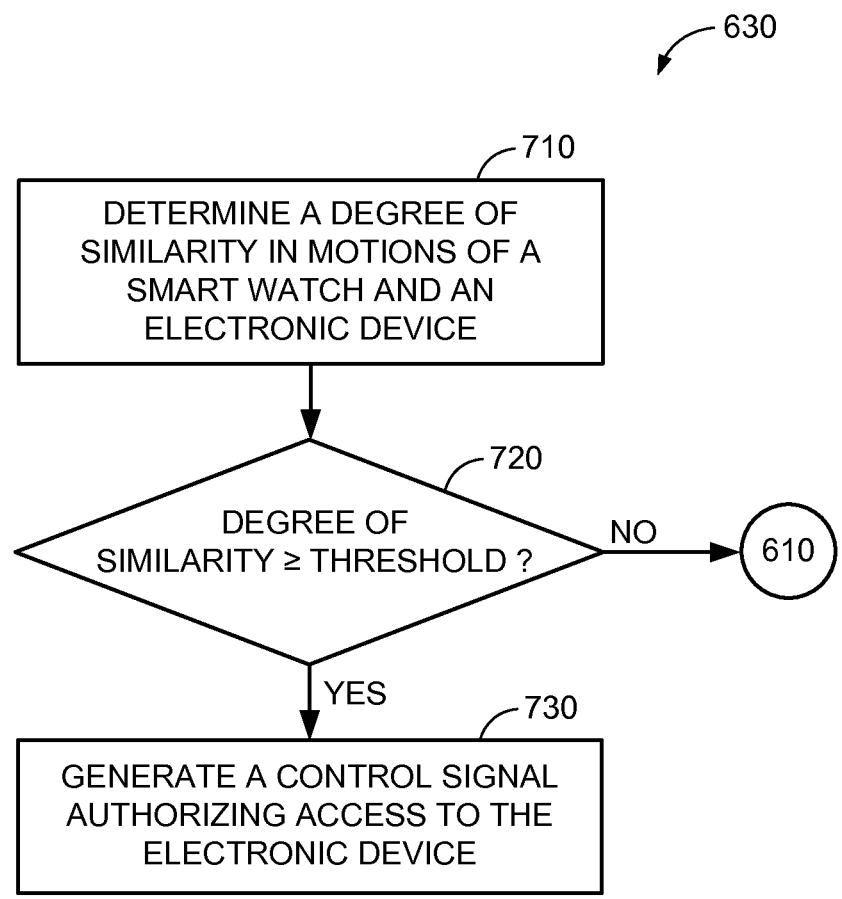
FIG. 7 illustrates a flowchart of a method, performed in a smart watch, for generating a control signal authorizing access to an electronic device based on a motion of the smart watch and a motion of the electronic device, according to one embodiment of the present disclosure.

FIG. 7 illustrates a flowchart of a method 630, performed in the smart watch 112, for generating the control signal authorizing access to the electronic device 390 based on a motion of the smart watch 112 and a motion of the electronic device 390, according to one embodiment of the present disclosure. Once the smart watch 112 obtains the data indicative of the motions of the smart watch 112 and the electronic device 390, at 620, the smart watch 112 may compare the obtained motion data to determine whether to authorize access to the electronic device 390, at 630. In the illustrated embodiment, the smart watch 112 may determine a degree of similarity in the motions of the smart watch 112 and the electronic device 390 to compare the motions of the smart watch 112 and the electronic device 390, at 710.

The degree of similarity in motions may be compared with a predetermined threshold, at 720. If it is determined that the degree of similarity in motions is greater than or equal to the threshold (i.e., YES at 720), the method may proceed to 730 to generate the control signal authorizing access to the electronic device 390. On the other hand, if it is determined that the degree of similarity in motions is less than the threshold (i.e., NO at 720), the method may proceed to 610 and access to the electronic device 390 is not authorized. In this case, the motion processing unit 316 in the smart watch 112 may compare the degree of similarity with the threshold, at 720.

Figure 8:
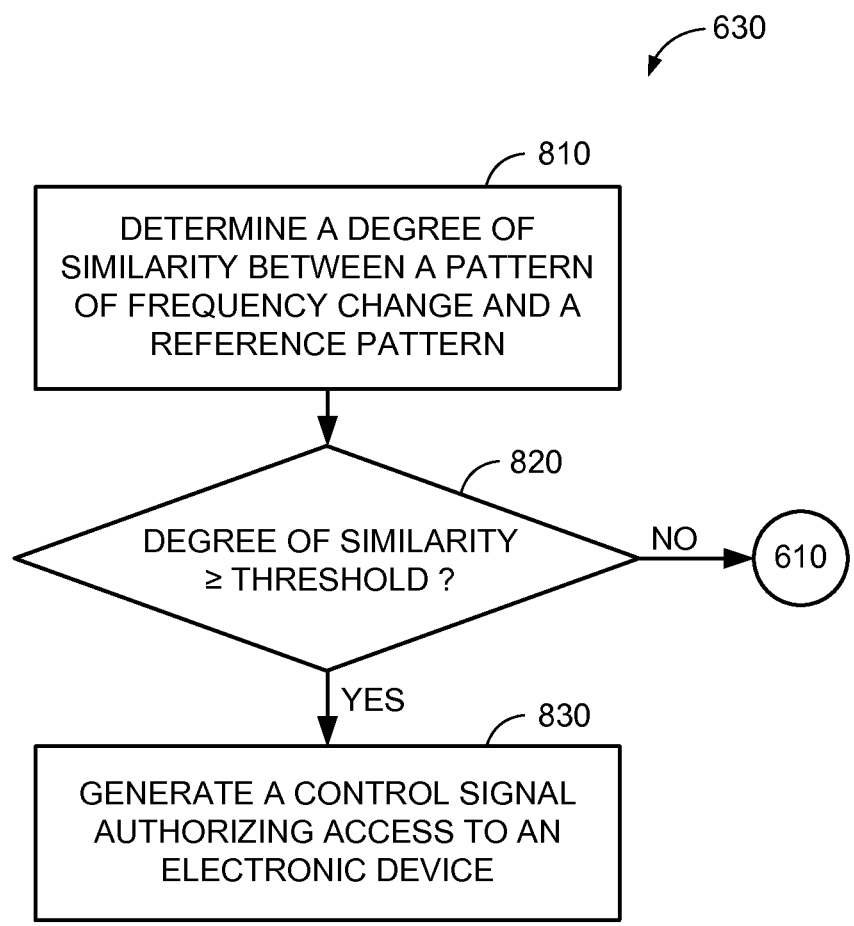
FIG. 8 illustrates a flowchart of a method, performed in a smart watch, for generating a control signal authorizing access to an electronic device based on a pattern of frequency change in a Doppler signal received from the electronic device and a reference pattern, according to one embodiment of the present disclosure.

FIG. 8 illustrates a flowchart of a method 630, performed in a smart watch 112, for generating the control signal authorizing access to the electronic device 390 based on a pattern of frequency change in a Doppler signal received from the electronic device 390 and a reference pattern, according to one embodiment of the present disclosure. Upon receiving a signal (e.g., the Doppler signal) transmitted from the electronic device 390, the smart watch 112 may determine the pattern of frequency change in the signal as data indicative of a relative motion between the smart watch 112 and the electronic device 390, at 620. The smart watch 112 may then compare the pattern of frequency change in the signal with a reference pattern stored in the authorization database 332 of the smart watch 112.

In the illustrated embodiment, the smart watch 112 may determine a degree of similarity between the pattern of frequency change in the received signal and the reference pattern to compare patterns, at 810. The degree of similarity between the pattern of frequency change and the reference pattern may be compared with a predetermined threshold, at 820. If it is determined that the degree of similarity is greater than or equal to the threshold (i.e., YES at 820), the method may proceed to 830 to generate the control signal authorizing access to the electronic device 390. On the other hand, if it is determined that the degree of similarity is less than the threshold (i.e., NO at 820), the method may proceed to 610 and access to the electronic device 390 is not authorized. In this case, the Doppler processing unit 318 in the smart watch 112 may compare the degree of similarity with the threshold, at 820.

Figure 9A:
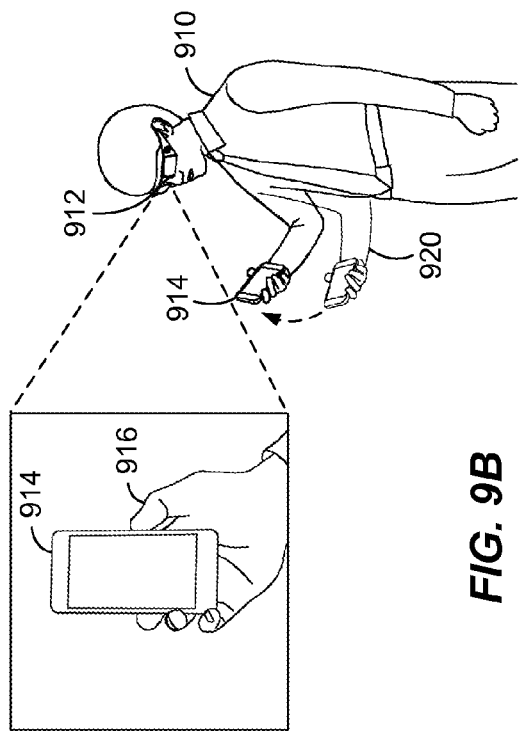
FIGS. 9A to 9C illustrate a sequence of motions by a user wearing smart glasses and holding an electronic device in a hand for authorizing access to the electronic device by the smart glasses, according to one embodiment of the present disclosure.
Figure 9B:
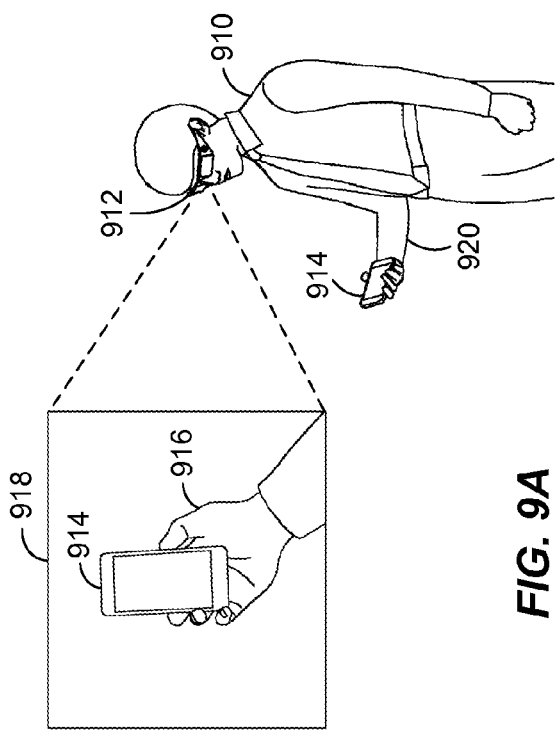
Figure 9C:
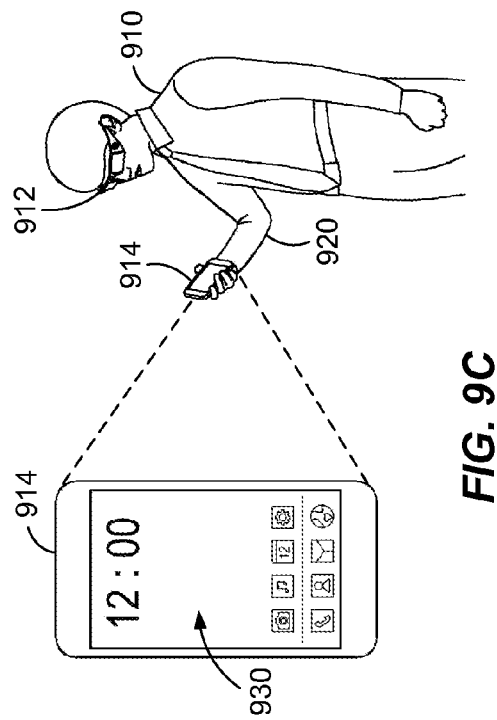

FIGS. 9A to 9C illustrate a sequence of motions by a user 910 wearing smart glasses 912 and holding a smartphone 914 in a hand 916 for authorizing access to the smartphone 914 by the smart glasses 912, according to one embodiment of the present disclosure. Initially, the smart glasses 912 may capture an image of the smartphone 914 and compare the captured image with a reference image of the smartphone 914. If it is determined that the captured image of the smartphone 914 is similar to the reference image, a signal (e.g., instruction, command, or the like) may be generated and transmitted to the smartphone 914 to authorize access to the smartphone 914. In a further embodiment, the smart glasses 912 may detect a motion of the smartphone 914 and receive a motion of the smartphone 914 that may be detected by the smartphone 914. The smart glasses 912 may compare the detected motion with the motion received from the smartphone 914 and authorize access to the smartphone 914 if the motions are determined to be similar. In this case, a signal may be generated and transmitted to the smartphone 914 to authorize access to the smartphone 914. In response to the signal, the smartphone 914 may be automatically activated for access by the user 910. For example, the smartphone 914 may be automatically unlocked or may automatically perform a predetermined function such as activating an e-mail application, a messaging application, an SNS application, and the like.

FIG. 9A shows the user 910 wearing the smart glasses 912 and initially looking at the smartphone 914 held in the user's hand 916, according to one embodiment of the present disclosure. The smart glasses 912 and the smartphone 914 may be configured to establish wirelessly communication with each other using any suitable short range communication technologies such as Bluetooth, Wi-Fi Direct, LTE Direct, NFC, UWB, IR communication technology, and the like. The smart glasses 912 and the smartphone 914 may also communicate wirelessly with data communication networks through any suitable communication schemes such as CDMA, GSM, LTE, LTE Advanced, Wi-Fi, and the like. Based on such communication schemes, the smart glasses 912 and smartphone 914 may transmit and receive information such as messages, e-mails, SNS messages, and the like through the communication networks.

In FIG. 9A, the smartphone 914 may initially be in a locked mode to prevent access by an unauthorized user. While in this mode, the user 910 may form intent to use the smartphone 914 to access a function or an application in the smartphone 914 such as web surfing, listening to music, gaming, reading an e-book, or the like. The user 910 may also form intent to use the smartphone 914 upon receiving a notification from the smartphone 914 indicative of an event such as a receipt of a message, an email, a calendar event, etc. In such cases, the user 910 may move the smartphone 914 in the user's hand 916 toward the user 910 to use the smartphone 914.

Initially, the user 910 may have picked up the smartphone 914 in the user's hand 916 and, as shown in FIG. 9A, hold the smartphone 914 in the user's hand 916. Before picking up the smartphone 914, the user 910 may have touched or made contact with the smartphone 914. In such a case, the smartphone 914 may proceed to detect contact with the user's hand 916 and a motion of the smartphone 914 indicative of a motion of a user's act of moving the smartphone 914 toward the user 910 to use the smartphone 914. Upon detecting such contact or motion, the smartphone 914 may transmit a signal indicating detection of a contact or motion indicative of a user's intent to use a smartphone to the smart glasses 912.

In response to the signal indicating detection of a contact or motion from the smartphone 914, the smart glasses 912 may capture one or more images of the smartphone 914. In one embodiment, upon picking up the smartphone 914, the user 910 may look at the smartphone 914 held in the user's hand 916 as shown in FIG. 9A. While the user 910 looks at the smartphone 914, the smart glasses 912 may capture an image 918 of a scene including the smartphone 914 and detect an image of the smartphone 914 in the image 918. The image of the smartphone 914 may be extracted and compared with a reference image of the smartphone 914 registered in advance for verification. If it is verified that the extracted image of the smartphone 914 matches the reference image of the smartphone 914, the smart glasses 912 may generate a control signal authorizing access to the smartphone 914 and transmit the control signal to the smartphone 914.

After initially picking up the smartphone 914, the user 910 may move the smartphone 914 toward the user 910 to use the smartphone 914 by moving a user's arm 920 as depicted in FIG. 9B, according to one embodiment of the present disclosure. In one embodiment, the smart glasses 912 may detect a motion of the smartphone 914 and receive motion data for a motion of the smartphone 914 from the smartphone 914 associated with moving the user's arm 920. The detected motion data for the motion of the smartphone 914 and the received motion data from the smartphone 914 may then be compared to determine whether the motion data for the motions are similar. If the motion data are similar, the smart glasses 912 may generate a control signal authorizing access to the smartphone 914 and transmit the control signal to the smartphone 914.

In one embodiment, the smart glasses 912 may determine whether to authorize access to the smartphone 914 based on the motion of the smartphone 914 associated with moving the user's arm 920. Such a determination may allow distinguishing between two or more smartphones that may be identical or similar in appearance. For example, two or more smartphones may be an identical model from one manufacturer and the smart glasses 912 may store an image of one of the smartphones as a registered image of a device authorized to be accessed. If an image of two such smartphones is captured by the smart glasses 912, the smart glasses 912 may initially recognize both smartphones as being associated with the registered image. In this case, the smart glasses 912 may identify one of the smartphones as a device associated with the registered image based on motions of both smartphones and motion data that may be received from either of the smartphones.

In response to receiving the control signal authorizing access to the smartphone 914 from the smart glasses 912, the smartphone 914 may be activated for access by the user 910. FIG. 9C shows the user 910 looking at the smartphone 914 that has been activated for access by the user 910 in response to the control signal from the smart glasses 912, according to one embodiment of the present disclosure. As shown, the smartphone 914 displays a startup or home screen 930 that has been unlocked in response to the control signal. In some embodiments, the smartphone 914 may be automatically unlocked or automatically perform a predetermined function such as activating an e-mail application, a messaging application, an SNS application, and the like. By determining whether to allow access to the smartphone 914 based on one or more images of the smartphone 914 and/or a motion of the smartphone 914, the smart glasses 912 may allow the user 910 to conveniently access the smartphone 914 without additional input from the user 910.

In another embodiment, the smartphone 914 may determine whether to authorize access to the smartphone 914 based on one or more images of the smartphone 914 and/or a motion of the smartphone 914. In this case, the smartphone 914 may receive the images of the smartphone 914 captured by the smart glasses 912 and compare the images with the reference image of the smartphone 914. If one or more images of the smartphone 914 are similar to the reference image of the smartphone 914, the smartphone 914 may be activated for access by the user. The smartphone 914 may additionally detect a motion of the smartphone 914 and also receive data associated with the motion of the smartphone 914 as detected by the smart glasses 912. The motion data for the detected motion and the received motion data may then be compared to determine whether to authorize access to the electronic device 390. If it is determined that the motions are similar, the smartphone 914 may be activated for access by the user 910.

Figure 10:
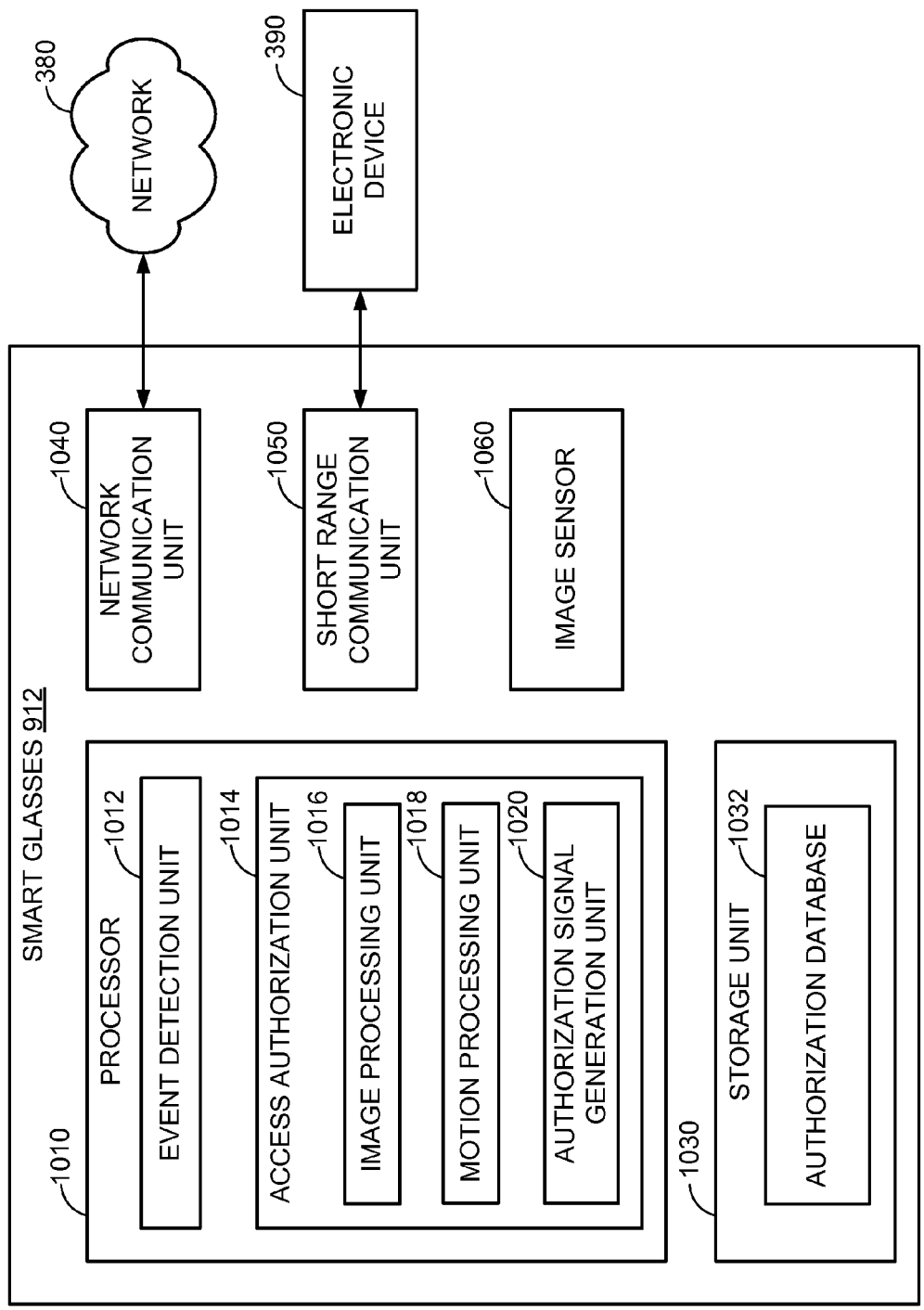
FIG. 10 illustrates a block diagram of smart glasses configured to authorize access to an electronic device upon capturing an image of the electronic device or detecting a motion of the electronic device, according to one embodiment of the present disclosure.

FIG. 10 illustrates a block diagram of the smart glasses 912 configured to authorize access to the electronic device 390 based on one or more images of the electronic device 390 and a motion of the electronic device 390, according to one embodiment of the present disclosure. The smart glasses 912 may include a processor 1010, a storage unit 1030, a network communication unit 1040, a short range communication unit 1050, and an image sensor 1060. The smart glasses 912 may be any suitable wearable devices equipped with image detecting and processing capabilities.

The smart glasses 912 may be configured to establish communication with the electronic device 390 that is located within a communication range of the short range communication unit 1050. The short range communication unit 1050 may use any suitable communication technologies such as Bluetooth, Wi-Fi Direct, LTE Direct, NFC, UWB, IR communication technology, and the like. According to one embodiment, the smart glasses 912 and the electronic device 390 may be configured to recognize and communicate with each other when the short range communication units 470 and 1050 are within communication ranges of each other. Upon establishing communication with the electronic device 390, the smart glasses 912 may communicate with the electronic device 390 via the short range communication unit 1050 to transmit and receive data for authorizing access to the electronic device 390.

The smart glasses 912 may also communicate wirelessly with external devices via the network communication unit 1040 over the external network 380. The network communication unit 1040 may be configured to communicate with the external network 380 through any suitable wireless network communication schemes such as CDMA, GSM, LTE, LTE Advanced, Wi-Fi, and the like. Using such communication schemes, the smart glasses 912 may wirelessly transmit and receive information such as messages, e-mails, SNS messages, and the like through the network communication unit 1040.

The image sensor 1060 in the smart glasses 912 may be configured to detect or capture one or more images of a scene including the electronic device 390 and generate image data for the images. For detecting or capturing the images that may include the electronic device 390, the image sensor 1060 may employ any suitable image sensing or detecting devices such as a CCD (charge-coupled device), active pixel sensors based on CMOS (complementary metal-oxide-semiconductor) or NMOS (N-type metal-oxide-semiconductor) technologies, and the like. The image sensor 1060 may detect one or more images that may include the electronic device 390 and provide image data associated with the images to the processor 1010 in the smart glasses 912.

The storage unit 1030 in the smart glasses 912 may store an authorization database 1032 that may be accessed by the processor 1010 for use in determining whether to authorize access to the electronic device 390. The authorization database 1032 may include a reference image of the electronic device 390 and one or more threshold values for determining a degree of similarity between images or motions. The storage unit 1030 may be implemented using any suitable storage or memory devices such as a RAM, a ROM, an EEPROM, a flash memory, an SSD, or the like.

The processor 1010 in the smart glasses 912 may be configured to detect the predetermined event indicative of a user's intent to use an electronic device and determine whether to authorize access to the electronic device 390. The processor 1010 may be an application processor (AP), a central processing unit (CPU), or a microprocessor unit (MPU) that may be configured to manage and operate the smart watch 112. As shown in FIG. 10, the processor 1010 may include an event detection unit 1012 and an access authorization unit 1014. Initially, the electronic device 390 may be in a locked mode to prevent access by an unauthorized user. While the electronic device 390 is in such a locked mode according to one embodiment, the event detection unit 1012 may detect a predetermined event indicative of a user's intent to use the electronic device 390. In response to detecting the predetermined event, the access authorization unit 1014 may proceed to determine whether to authorize access to the electronic device 390.

The event detection unit 1012 may be configured to detect a predetermined event and instruct the access authorization unit 1014 to determine whether to authorize access to the electronic device 390. The predetermined event may include any event or act that may be predetermined to be indicative of a user's intent to use an electronic device. In one embodiment, the predetermined event may include contact (e.g., touch) between a user and the electronic device 390 such as an act of holding or picking up the electronic device 390 by the user. The electronic device 390 may detect such contact with the user via the contact sensor 410 and transmit a signal indicative of contact to the smart glasses 912. In response to the signal indicative of contact, the event detection unit 1012 may recognize the signal as a predetermined event indicative of a user's intent to use the electronic device 390.

Additionally or alternatively, an event such as receipt of an e-mail, a message, a calendar event, and the like may be recognized as a predetermined event. When such an event is received from the external network 380 or the electronic device 390, the event detection unit 1012 may identify the event as a predetermined event indicative of a user's intent to use the electronic device 390. According to one embodiment, the electronic device 390 may detect an event such as a receipt of an e-mail, a message, a calendar event, or the like and transmit a notification of such an event to the smart glasses 912. The event detection unit 1012 may receive the notification and identify the notification as a predetermined event indicative of a user's intent to use the electronic device 390.

In some embodiments, the event detection unit 1012 may detect a predetermined event indicative of a user's intent to use an electronic device when one or more predetermined objects are detected. Such predetermined objects may include a user's hand, the electronic device 390, a predetermined symbol printed in the electronic device 390, a specific part of the electronic device 390, and the like. When an object (e.g., the electronic device 390) is in a field of view of the image sensor 1060 in the smart glasses 912, the image sensor 1060 may capture an image of the object and transmit the captured image to the event detection unit 1012. Upon receiving the captured image, the event detection unit 1012 may detect the object as a predetermined object and identify an event of detecting the predetermined object as a predetermined event. In one embodiment, the smart glasses 912 may be equipped with one or more additional image sensors (e.g., a low power image sensor) that may be operable continuously to detect or capture a plurality of images of scenes including one or more objects.

Upon identifying an event as a predetermined event, the event detection unit 1012 may instruct the access authorization unit 1014 to determine whether to authorize access to the electronic device 390. Additionally, the event detection unit 1012 may send a signal instructing the image sensor 1060 to detect a plurality of images including the electronic device 390. Further, a signal may be sent to the electronic device 390 instructing the activation processing unit 434 to detect a motion of the electronic device 390 and transmit data associated with the motion of the electronic device 390 to the smart glasses 912.

The access authorization unit 1014 in the processor 1010 may determine whether to authorize access to the electronic device 390 in response to an instruction from the event detection unit 1012. As shown in FIG. 10, the access authorization unit 1014 may include an image processing unit 1016, a motion processing unit 1018, and an authorization signal generation unit 1020. The image processing unit 1016 may be configured to determine whether to authorize access to the electronic device 390 based on one or more images of the electronic device 390 and a reference image of the electronic device 390. The motion processing unit 1018 may determine whether to authorize access to the electronic device 390 based on a motion of the electronic device 390. In response to an instruction from the image processing unit 1016 or the motion processing unit 1018 authorizing access to the electronic device 390, the authorization signal generation unit 1020 may generate a control signal authorizing access to the electronic device 390 and transmit the signal to the electronic device 390.

In some embodiments, the smart glasses 912 may determine whether to authorize access to the electronic device 390 based on one or more images of the electronic device 390. For example, when the user 910 is wearing the smart glasses 912, the user 910 may pick up the electronic device 390 in the user's hand and move the electronic device 390 toward the user 910 to use the electronic device 390. While the user 910 is moving the electronic device 390 toward the user 910, the image sensor 1060 in the smart glasses 912 may capture one or more images of a scene including the electronic device 390 and provide the captured images to the image processing unit 1016.

Upon receiving the one or more images of the scene including the electronic device 390, the image processing unit 1016 may detect the electronic device 390 in the received images. In one embodiment, the image processing unit 1016 may detect the electronic device 390 in a received image and segment an image of the electronic device 390 from the image. The segmented image of the electronic device 390 may then be extracted and compared with the reference image of the electronic device 390 from the authorization database 1032 in the storage unit 1030. The reference image may be generated by receiving or capturing an image of the electronic device 390 and registering the received or captured image as the reference image of the electronic device 390. The image processing unit 1016 may then compare the extracted image of the electronic device 390 with the reference image of the electronic device 390. In one embodiment, the reference image of the electronic device 390 may be registered in response to a user's command or input such as a voice command (e.g., "REGISTER IMAGE"), a gesture, etc. and stored in the authorization database 1032.

The image processing unit 1016 may compare the extracted image of the electronic device 390 with the reference image to determine whether the extracted image of the electronic device 390 is similar to the reference image of the electronic device 390. In one embodiment, the image processing unit 1016 may determine whether the images are similar by calculating a degree of similarity between the images. Upon generating the degree of similarity between the images, the authorization database 1032 in the storage unit 1030 may be accessed to retrieve a similarity threshold. The authorization database 1032 may include a plurality of similarity thresholds associated with a plurality of degrees of sensitivity and any suitable similarity threshold may be selected for use in determining the similarity between the images. If the degree of similarity is greater than or equal to the similarity threshold, the extracted image of the electronic device 390 may be determined to be similar to the reference image.

If the image of the electronic device 390 is determined to be similar to the reference image of the electronic device 390, the image processing unit 1016 may determine that access to the electronic device 390 may be authorized and provide a signal instructing the authorization signal generation unit 1020 to authorize access to the electronic device 390. In response to the instruction signal, the authorization signal generation unit 1020 may generate a control signal authorizing access to the electronic device 390 and transmit the control signal to the electronic device 390 via the short range communication unit 1050. On the other hand, if the image of the electronic device 390 is determined not to be similar to the reference image, the image processing unit 1016 may determine that the access to the electronic device 390 is not authorized.

The motion processing unit 1018 in the smart glasses 912 may also detect a motion of the electronic device 390 and receive data associated with the motion from the electronic device 390. When the user 910 moves the electronic device 390 toward the user 910 to use the electronic device 390, the motion of the electronic device 390 detected by the smart glasses 912 may be similar to the motion of the electronic device 390 detected by the motion sensor 420 in the electronic device 390. In one embodiment, the image sensor 1060 may capture a plurality of images of a scene including the electronic device 390 and provide the captured images to the motion processing unit 1018. From the captured images, the motion processing unit 1018 may detect a motion of the electronic device 390 and generate motion data indicative of the motion of the electronic device 390 such as trajectory data or pattern data for the motion. In addition, the motion sensor 420 in the electronic device 390 may also detect the motion of the electronic device 390 and the electronic device 390 may transmit motion data for the motion of the electronic device 390 to the smart glasses 912.

Upon generating the motion data for the detected motion of the electronic device 390 and receiving the motion data associated with the motion from the electronic device 390, the motion processing unit 1018 may determine whether the motion data for the detected motion of the electronic device 390 are similar to the motion data received from the electronic device 390. In one embodiment, the motion data for the detected motion of the electronic device 390 are compared with the motion data received from the electronic device 390 to determine a degree of similarity between the motion data. In this process, the motion processing unit 1018 may access the authorization database 1032 in the storage unit 1030 that may include one or more similarity thresholds associated with one or more degrees of sensitivity. From the authorization database 1032, a similarity threshold may be selected and compared with the degree of similarity to determine whether the motions of the electronic device 390 as detected by the smart glasses 912 and the electronic device 390 are similar. If the degree of similarity is greater than or equal to the similarity threshold, the motion data for the detected motion of the electronic device 390 and the motion data received from the electronic device 390 may be determined to be similar. In this case, the motion processing unit 1018 may then determine that access to the electronic device 390 is authorized and provide a signal instructing the authorization signal generation unit 1020 to authorize access to the electronic device 390. On the other hand, if the degree of similarity is determined to be less than the similarity threshold, the motion processing unit 316 may determine that access to the electronic device 390 is not authorized. In this case, a signal may be generated and provided to the authorization signal generation unit 1020 indicating that access to the electronic device 390 is not authorized. Alternatively, no signal may be generated or provided to the authorization signal generation unit 1020.

In response to a signal from the image processing unit 1016 or the motion processing unit 1018, the authorization signal generation unit 1020 may generate a control signal authorizing access to the electronic device 390 and transmit the control signal to the electronic device 390 via the short range communication unit 1050. The activation processing unit 434 in the electronic device 390 may receive the control signal authorizing access to the electronic device 390 and activate the electronic device 390 to allow access by a user. In one embodiment, the activation processing unit 434 may activate the electronic device 390 by automatically unlocking the electronic device 390 to display a startup or home screen, or performing a predetermined function without performing additional actions or inputting additional information by a user. For example, when the predetermined event is an event such as receiving an e-mail, a message, or an SNS message, the activation processing unit 434 may activating an e-mail application, a messaging application, an SNS application, or the like. In this case, a specific e-mail, message, or SNS message may be directly activated and displayed on a display screen of the I/O unit 440 in the electronic device 390.

According to some embodiments, the image sensor 1060 may capture a plurality of images of a scene including two or more identical or similar electronic devices. For example, the electronic device 390 and one or more other electronic devices may be an identical model from one manufacturer and thus may have an identical or similar appearance. In one embodiment, the motion processing unit 1018 may receive a plurality of images that includes the two or more electronic devices from the image sensor 1060 and extract images of the electronic devices from the images. The extracted images of the electronic devices may then be compared with a reference image of the electronic device 390 retrieved from the authorization database 1032 in the storage unit 1030. In this case, the image processing unit 1016 may recognize the two or more electronic devices as being associated with the reference image of the electronic device 390 due to the identical or similar appearance of the extracted images for the electronic devices.

Upon recognizing two or more electronic devices as being associated with the reference image of the electronic device, the image processing unit 1016 may instruct the motion processing unit 1018 to identify an electronic device among the two or more electronic devices for access by a user based on motions of the electronic devices. In response, the motion processing unit 1018 may receive a plurality of images including the two or more electronic devices. In one embodiment, the images may be received from the image processing unit 1016 or the image sensor 1060. The motion processing unit 1018 may then detect motions of the two or more electronic devices from the received images.

In addition to receiving the plurality of images including the two or more electronic devices, the motion processing unit 1018 may transmit a request to the activation processing unit 434 of the electronic device 390, with which communication has been established, to send motion data for the motion of the electronic device 390. Upon receiving the request, the activation processing unit 434 may receive motion data for a motion of the electronic device 390 detected by the motion sensor 420 in the electronic device 390 and transmit the motion data to the motion processing unit 1018. In this case, the motion processing unit 1018 may not receive motion data from electronic devices with which communication has not been established. The motion processing unit 1018 may then determine whether the motion data of the detected motions for the two or more electronic devices are similar to the motion data received from the electronic device 390. If the motion data for one of the detected motions of the two or more electronic devices are similar to the motion data received from the electronic device 390 to be accessed, a control signal authorizing access the electronic device 390 is generated and transmitted to the electronic device 390.

Additionally or alternatively, the electronic device 390 may determine whether to authorize access to the electronic device 390 based on an image of the electronic device 390 and a motion of the electronic device 390. In this case, the activation processing unit 434 may receive, from the smart glasses 912, image data of the electronic device 390 and motion data of the electronic device 390. Additionally, the event detection unit in the electronic device 390 may detect a predetermined event. In one embodiment, the processor 430 in the electronic device 390 may include one or more processing units of the processor 1010 of the smart glasses 912. For example, the processor 430 may also include the event detection unit 1012, the image processing unit 1016, and/or the motion processing unit 1018 of the smart glasses 912. Further, the storage unit 450 in the electronic device 390 may store the authorization database 1032 of the smart glasses 912.

Figure 11:
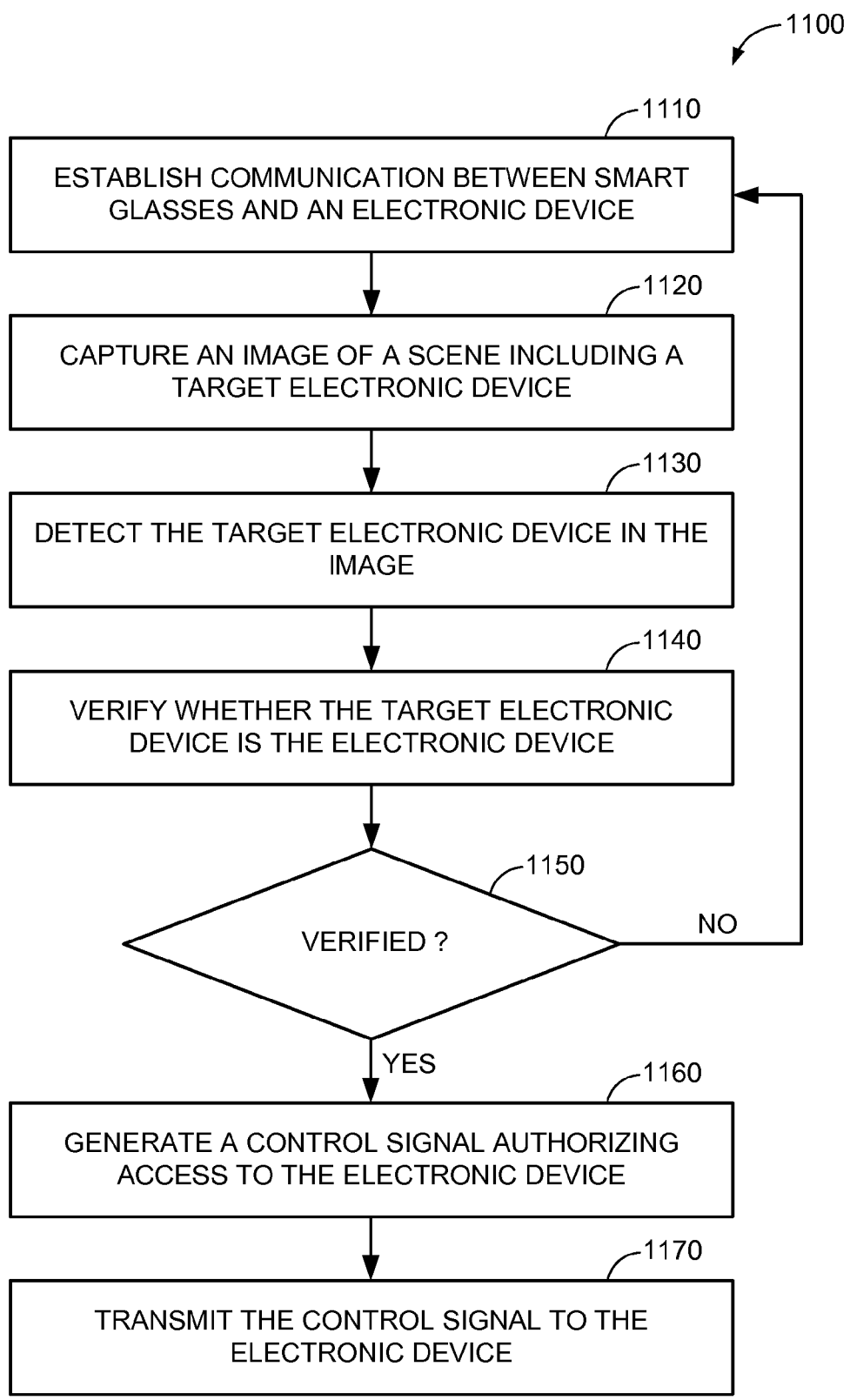
FIG. 11 illustrates a flowchart of a method, performed in smart glasses, for authorizing access to an electronic device based on a captured image of the electronic device and a reference image of the electronic device, according to one embodiment of the present disclosure.

FIG. 11 illustrates a flowchart of a method 1100, performed in the smart glasses 912, for authorizing access to the electronic device 390 based on the one or more captured images of the electronic device 390 and the reference image of the electronic device 390, according to one embodiment of the present disclosure. When the short range communication units 470 and 1050 are within communication range, the communication between the smart glasses 912 and the electronic device 390 may be established, at 1110. Upon establishing the communication with the electronic device 390, the smart glasses 912 may communicate with the electronic device 390 via the short range communication units 470 and 1050 to transmit and receive data for authorizing access to the electronic device 390.

The smart glasses 912 may capture an image of a scene including a target electronic device (e.g., the electronic device 390), at 1120. The image sensor 1060 in the smart glasses 912 may detect or capture the image of the scene including the target electronic device and then provide the captured image to the image processing unit 1016 in the smart glasses 912. In one embodiment, in response to detecting a predetermined event in at least one of the smart glasses 912 and the electronic device 390, the smart glasses 912 may capture the image of the scene including the target electronic device. In this case, the predetermined event may include at least one of contact with the electronic device 390, a receipt of a message, and a detection of a predetermined object.

In response to capturing the image of the scene including the target electronic device, the smart glasses 912 may detect the target electronic device in the image, at 1130. In this embodiment, the image processing unit 1016 in the smart glasses 912 may segment and extract an image of a candidate electronic device from the captured image and identify the candidate electronic device as the target electronic device. When the target electronic device is detected and identified from the captured image, the smart glasses may verify whether the target electronic device is the electronic device 390, at 1140.

To verify whether the target electronic device is the electronic device 390, the image processing unit 1016 in the smart glasses 912 may access the reference image of the electronic device 390 from the authorization database 1032 in the storage unit 1030 and compare the image of the target electronic device with the reference image of the electronic device 390. The reference image of the electronic device 390 may be generated by receiving or capturing an image of the electronic device 390 and registering the received or captured image as the reference image of the electronic device 390. It is verified whether the target electronic device is the electronic device, at 1150. If it is verified that the target electronic device in the image is the electronic device 390 (i.e., YES at 1150), the method may proceed to 1160 to generate a control signal authorizing access to the electronic device 390 at the authorization signal generation unit 1020. If it is not verified that the target electronic device in the image is the electronic device 390 (i.e., NO at 1150), the method may proceed to 1110 and access to the electronic device 390 is not authorized.

Once the control signal authorizing access to the electronic device 390 is generated at the authorization signal generation unit 1020 in the smart glasses 912, the smart glasses 912 may transmit the control signal to the electronic device 390 via the short range communication unit 1050, at 1170. In this process, the control signal may be adapted to instruct the electronic device 390 to perform a function to provide access to the electronic device 390. For example, the electronic device 390 may be automatically unlocked or may automatically perform a predetermined function such as activating an e-mail application, a messaging application, an SNS application, and the like. By allowing access to the electronic device 390 based on the image of the electronic device 390, a user may conveniently access to the electronic device 390 without performing additional actions or inputting additional information by the user.

Figure 12:
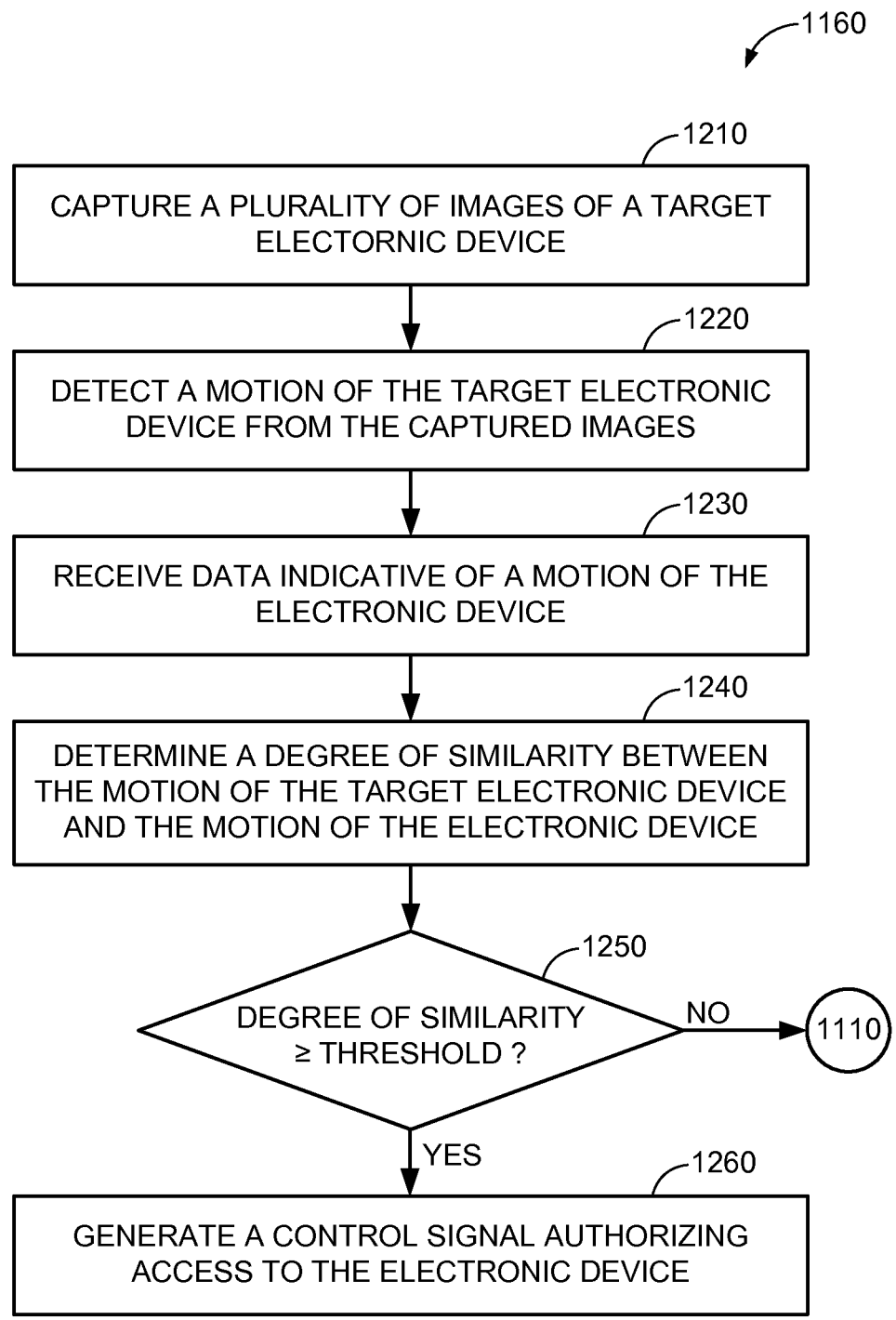
FIG. 12 illustrates a flowchart of a method, performed in smart glasses, for authorizing access to an electronic device based on a motion of the electronic device detected from a plurality of images of the electronic device, according to one embodiment of the present disclosure.

FIG. 12 illustrates a flowchart of a method 1160, performed in smart glasses 912, for authorizing access to the electronic device 390 by detecting a motion of the electronic device 390 from a plurality of images of the electronic device 390, according to one embodiment of the present disclosure. Once it is verified that the target electronic device is the electronic device 390, at 1150, the smart glasses 912 may also detect the motion of the target electronic device and receive data associated with the motion from the electronic device 390. The smart glasses 912 may capture a plurality of images of the target electronic device to detect the motion of the target electronic device, at 1210. In one embodiment, the image sensor 1060 in the smart glasses 912 may capture a plurality of images of a scene including the target electronic device and provide the captured images to the motion processing unit 1018 to detect the motion of the target electronic device in the smart glasses 912. From the captured images, the smart glasses 912 may detect the motion of the target electronic device and generate motion data indicative of the motion of the target electronic device, at 1220. In addition, the motion of the electronic device 390 may be detected by the motion sensor 420 in the electronic device 390 and then the smart glasses 912 may receive data indicative of the motion of the electronic device 390 from the electronic device 390, at 1230.

Upon generating the motion data for the detected motion of the target electronic device and receiving the motion data associated with the motion of the electronic device 390, the smart glasses 912 may determine a degree of similarity between the motion of the target electronic device and the motion of the electronic device 390, at 1240. The smart glasses 912 may access the authorization database 1032 in the storage unit 1030 to retrieve a threshold and then compare the predetermined threshold with the degree of similarity between the motions, at 1250. If the degree of similarity is greater than or equal to the threshold (i.e., YES at 1250), the method may proceed to 1260 to generate a control signal authorizing access to the electronic device 390 at the authorization signal generation unit 1020 in the smart glasses 912. If the degree of similarity is less than the threshold (i.e., NO at 1250), the method may proceed to 1110 and access to the electronic device 390 is not authorized.

Figure 13:
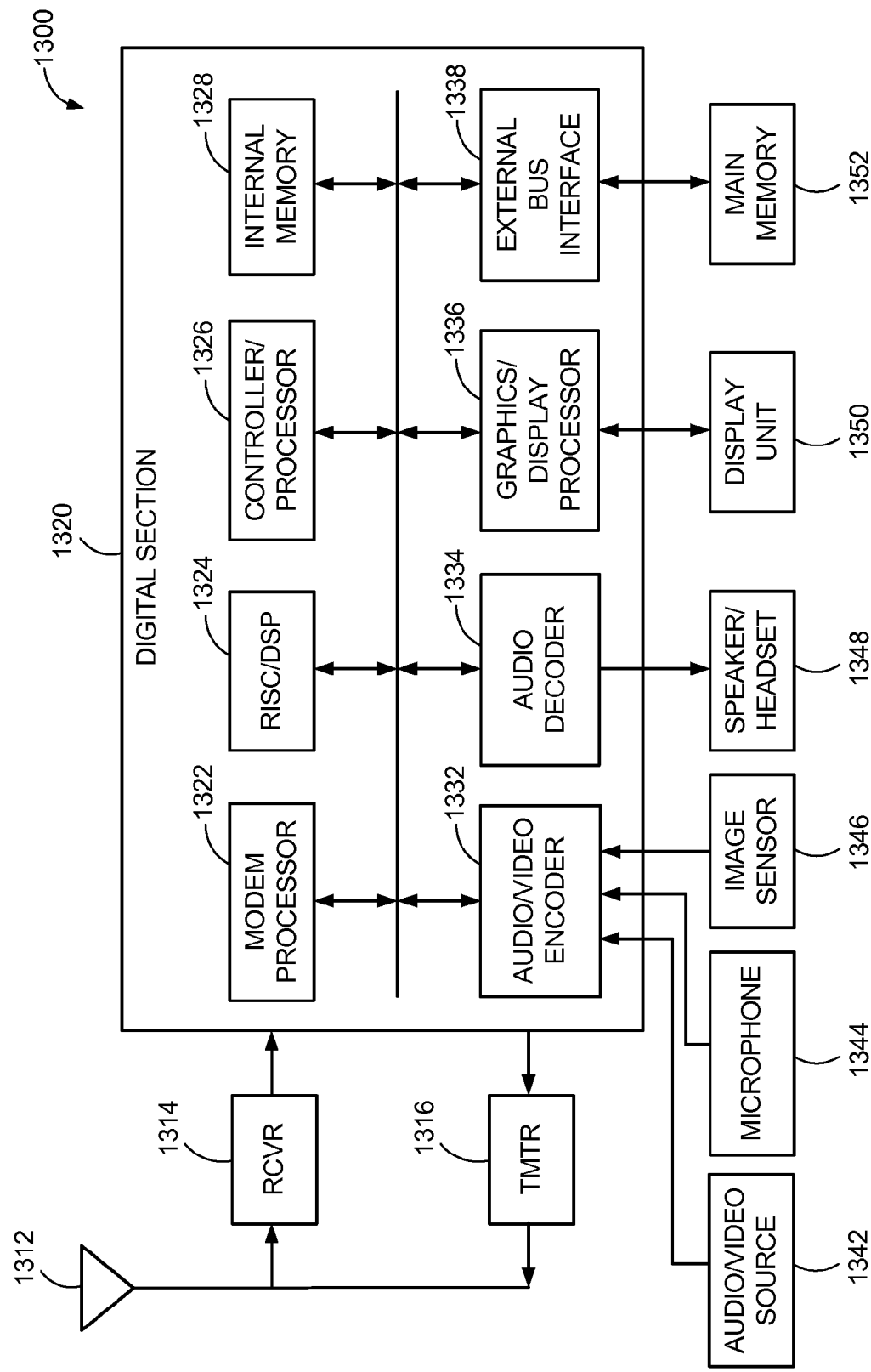
FIG. 13 is a block diagram of an exemplary electronic device in which methods and apparatus for authorizing access to an electronic device based on user intent-based activities are implemented according to some embodiments of the present disclosure.

FIG. 13 is a block diagram of an exemplary electronic device 1300 in which the methods and apparatus for authorizing access to the electronic device 390 may be implemented according to some embodiments of the present disclosure. The configuration of the electronic device 1300 may be implemented in the electronic devices according to the above embodiments described with reference to FIGS. 1 to 12. The electronic device 1300 may be a cellular phone, a smartphone, a wearable device, a tablet computer, a laptop computer, a terminal, a handset, a personal digital assistant (PDA), a wireless modem, a cordless phone, etc. The wireless communication system may be a Code Division Multiple Access (CDMA) system, a Broadcast System for Mobile Communications (GSM) system, Wideband CDMA (WCDMA) system, Long Tern Evolution (LTE) system, LTE Advanced system, etc. Further, the electronic device 1300 may communicate directly with another mobile device, e.g., using Wi-Fi Direct or Bluetooth.

The electronic device 1300 is capable of providing bidirectional communication via a receive path and a transmit path. On the receive path, signals transmitted by base stations are received by an antenna 1312 and are provided to a receiver (RCVR) 1314. The receiver 1314 conditions and digitizes the received signal and provides samples such as the conditioned and digitized digital signal to a digital section for further processing. On the transmit path, a transmitter (TMTR) 1316 receives data to be transmitted from a digital section 1320, processes and conditions the data, and generates a modulated signal, which is transmitted via the antenna 1312 to the base stations. The receiver 1314 and the transmitter 1316 may be part of a transceiver that may support CDMA, GSM, LTE, LTE Advanced, etc.

The digital section 1320 includes various processing, interface, and memory units such as, for example, a modem processor 1322, a reduced instruction set computer/digital signal processor (RISC/DSP) 1324, a controller/processor 1326, an internal memory 1328, a generalized audio/video encoder 1332, a generalized audio decoder 1334, a graphics/display processor 1336, and an external bus interface (EBI) 1338. The modem processor 1322 may perform processing for data transmission and reception, e.g., encoding, modulation, demodulation, and decoding. The RISC/DSP 1324 may perform general and specialized processing for the electronic device 1300. The controller/processor 1326 may perform the operation of various processing and interface units within the digital section 1320. The internal memory 1328 may store data and/or instructions for various units within the digital section 1320.

The generalized audio/video encoder 1332 may perform encoding for input signals from an audio/video source 1342, a microphone 1344, an image sensor 1346, etc. The generalized audio decoder 1334 may perform decoding for coded audio data and may provide output signals to a speaker/headset 1348. The graphics/display processor 1336 may perform processing for graphics, videos, images, and texts, which may be presented to a display unit 1350. The EBI 1338 may facilitate transfer of data between the digital section 1320 and a main memory 1352.

The digital section 1320 may be implemented with one or more processors, DSPs, microprocessors, RISCs, etc. The digital section 1320 may also be fabricated on one or more application specific integrated circuits (ASICs) and/or some other type of integrated circuits (ICs).

In general, any device described herein may represent various types of devices, such as a wireless phone, a cellular phone, a laptop computer, a wearable device, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein are implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternate, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. Computer-readable media include both computer storage media and communication media including any medium that facilitates the transfer of a computer program from one place to another. A storage media may be any available media that can be accessed by a computer. By way of example, and not limited thereto, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Further, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations are referred to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method, performed by a first electronic device, for authorizing access to a second electronic device, the method comprising:
    obtaining, based on a signal received at the first electronic device from the second electronic device, data indicative of a motion of at least one of the first and second electronic devices in response to a movement of the at least one of the first and second electronic devices, wherein the data includes a frequency change sequence based on multiple frequency changes of the signal or multiple frequency differences between frequencies of the signal and a reference frequency;
    generating a control signal authorizing access to the second electronic device based on a comparison of the frequency change sequence to a reference frequency change sequence; and
    transmitting the control signal to the second electronic device.

2. The method of claim 1, wherein obtaining the data indicative of the motion comprises:
    detecting a defined event in at least one of the first and second electronic devices; and
    obtaining the data in response to detecting the defined event.

3. The method of claim 2, wherein the defined event includes at least one of contact with the second electronic device, receipt of a message, a defined motion of the first electronic device, and a defined motion of the second electronic device.

4. The method of claim 1, further comprising obtaining second data indicative of the motion, the second data including at least one of acceleration data, trajectory data, orientation data, and location data of the first and second electronic devices, wherein generating the control signal is further based on the second data.

5. The method of claim 1, wherein the motion of at least one of the first and second electronic devices includes a motion of the first electronic device and a motion of the second electronic device, and wherein generating the control signal authorizing access to the second electronic device comprises:
    determining whether a degree of similarity in the motions of the first electronic device and the second electronic device satisfies a threshold based on the data indicative of the motions of the first and second electronic devices; and
    generating the control signal in response to determining that the degree of similarity in the motions satisfies the threshold.

6. The method of claim 1, wherein generating the control signal authorizing access to the second electronic device comprises:
    determining whether a degree of similarity between the frequency change sequence and the reference frequency change sequence satisfies a threshold; and
    generating the control signal in response to determining that the degree of similarity satisfies the threshold.

7. The method of claim 1, wherein the signal comprises an ultrasound signal or a radio signal, and wherein the control signal is adapted to instruct the second electronic device to perform a function to provide access to the second electronic device.

8. An electronic device for authorizing access to a target device, the electronic device comprising:
    a data processing unit configured to authorize access to the target device based on data indicative of a motion of at least one of the electronic device and the target device, wherein the data is obtained in response to a movement of the at least one of the electronic device and the target device, wherein the data is obtained based on a frequency of a signal received from the target device, and wherein the data includes a frequency change sequence based on multiple frequency changes of the signal or multiple frequency differences between frequencies of the signal and a reference frequency; and
    a signal generation unit configured to generate and transmit a control signal to the target device based on a comparison of the frequency change sequence to a reference frequency change sequence.

9. The electronic device of claim 8, further comprising an event detection unit configured to detect a defined event in at least one of the electronic device and the target device, wherein the data processing unit is further configured to obtain the data in response to detecting the defined event.

10. The electronic device of claim 9, wherein the defined event includes at least one of contact with the target device, a receipt of a message, a defined motion of the electronic device, and a defined motion of the target device.

11. The electronic device of claim 8, wherein the data processing unit is further configured to authorize access to the target device based on second data indicative of the motion, the second data including at least one of acceleration data, trajectory data, orientation data, and location data of the electronic device and the target device.

12. The electronic device of claim 8, wherein the motion of at least one of the electronic device and the target device includes a motion of the electronic device and a motion of the target device, and wherein the data processing unit is configured to:
    determine whether a degree of similarity in the motion of at least one of the electronic device and the target device satisfies a threshold based on the data indicative of the motions of the electronic device and the target device; and
    authorize access to the target device in response to determining that the degree of similarity in the motions satisfies the threshold.

13. The electronic device of claim 8, further comprising a signal receiver configured to receive the signal from the target device, and wherein the data processing unit is configured to determine the frequency change sequence.

14. The electronic device of claim 13, wherein the data processing unit is configured to:
    determine whether a degree of similarity between the frequency change sequence and the reference frequency change sequence satisfies a threshold; and authorize access to the target device in response to determining that the degree of similarity satisfies the threshold.

15. The electronic device of claim 8, wherein the control signal is adapted to instruct the target device to perform a function to provide access to the target device.

16. A non-transitory computer-readable storage medium comprising instructions for authorizing access to a target device, the instructions causing a processor of an electronic device to perform the operation of:
   obtaining data indicative of a motion of at least one of the electronic device and the target device in response to a movement of the at least one of the electronic device and the target device, wherein the data is obtained based on a signal received from the target device, and wherein the data includes a frequency change sequence based on multiple frequency changes of the signal or multiple frequency differences between frequencies of the signal and a reference frequency;
   generating a control signal authorizing access to the target device based on a comparison of the frequency change sequence to a reference frequency change sequence; and
   transmitting the control signal to the target device.

17. The non-transitory computer-readable storage medium of claim 16, wherein the motion of at least one of the electronic device and the target device includes a motion of the electronic device and a motion of the target device, and wherein generating the control signal authorizing access to the target device comprises:
   determining whether a degree of similarity in the motions of the electronic device and the target device satisfies a threshold based on the data indicative of the motions of the electronic device and the target device; and
   generating the control signal in response to determining that the degree of similarity in the motions satisfies the threshold.

18. An electronic device for authorizing access to a target device, the electronic device comprising:
   means for authorizing access to the target device based on data indicative of a motion of at least one of the electronic device and the target device, wherein the data is obtained in response to a movement of the at least one of the electronic device and the target device, wherein the data is obtained based on a frequency of a signal received from the target device, and wherein the data includes a frequency change sequence based on multiple frequency changes of the signal or multiple frequency differences between frequencies of the signal and a reference frequency; and
   means for transmitting a control signal to the target device based on a comparison of the frequency change sequence to a reference frequency change sequence.

19. The electronic device of claim 18, further comprising means for detecting a defined event in at least one of the electronic device and the target device, wherein the means for authorizing access to the target device is configured to obtain the data in response to detecting the defined event.

20. The electronic device of claim 18, wherein the motion of at least one of the electronic device and the target device includes a motion of the electronic device and a motion of the target device, and wherein the means for authorizing access to the target device is configured to:
   determine whether a degree of similarity in the motions of the electronic device and the target device satisfies a threshold based on the data indicative of the motions of the electronic device and the target device; and
   authorize access to the target device in response to determining that the degree of similarity in the motions satisfies the threshold.

21. The electronic device of claim 18, further comprising means for receiving the signal from the target device, wherein the means for authorizing access to the target device is configured to determine the frequency change sequence.

22. The method of claim 1, wherein the first electronic device comprises a watch and the second electronic device comprises a phone or a pair of glasses.

23. The method of claim 1, wherein the first electronic device comprises a pair of glasses and the second electronic device comprises a phone or a watch.

24. The method of claim 1, wherein the first electronic device comprises a phone and the second electronic device comprises a watch or a pair of glasses.

25. A method, performed by a first electronic device, for authorizing access to a second electronic device, the method comprising:
   receiving a signal at the first electronic device from the second electronic device, wherein the signal is received having a receive frequency;
   determining a frequency difference between the receive frequency of the signal and a reference frequency of the signal, the reference frequency corresponding to a transmission frequency of the signal
   generating a control signal authorizing access to the second electronic device based on the frequency difference; and
   transmitting the control signal to the second electronic device.

26. A, method performed by a first electronic device, for authorizing access to a second electronic device, the method comprising:
   receiving a signal at the first electronic device from the second electronic device;
   determining a first frequency of the signal at a first time, determining a second frequency of the signal at a second time;
   determining a frequency change based on a difference between the first frequency of the signal and the second frequency of the signal, the frequency change indicative of a relative motion between the first electronic device and second electronic device;
   generating a control signal authorizing access to the second electronic device based on the frequency change; and
   transmitting the control signal to the second electronic device.

27. The method of claim 1, further comprising:
   establishing communication with the second electronic device, wherein the data is obtained based on the signal received at the first electronic device from the second electronic device.

28. A, method performed by a first electronic device, for authorizing access to a second electronic device, the method comprising:
   capturing an image of the second electronic device;
   detecting the second electronic device in the image;
   segmenting the image to generate a segmented image;
   extracting a portion of the segmented image to generate an extracted image of the second electronic device;
   determining a degree of similarity between the extracted image and a reference image associated with the second electronic device;

generating a control signal authorizing access to the second electronic device based on a determination that the degree of similarity satisfies a threshold; and transmitting the control signal to the second electronic device.

* * * * *